United States Patent
Bennah et al.

(10) Patent No.: US 11,308,110 B2
(45) Date of Patent: Apr. 19, 2022

(54) SYSTEMS AND METHODS FOR PUSHING CONTENT

(71) Applicant: Rovi Guides, Inc., San Jose, CA (US)

(72) Inventors: Albert Bennah, Cary, NC (US);
Jonathan B. Gilpin, Raleigh, NC (US);
James W. Lent, Durham, NC (US);
Kyle Miller, Durham, NC (US); Bryan S. Scappini, Cary, NC (US)

(73) Assignee: ROVI GUIDES, INC., San Jose, CA (US)

( * ) Notice: Subject to any disclaimer, the term of this patent is extended or adjusted under 35 U.S.C. 154(b) by 179 days.

(21) Appl. No.: 16/541,969

(22) Filed: Aug. 15, 2019

(65) Prior Publication Data

US 2021/0049161 A1 Feb. 18, 2021

(51) Int. Cl.
*G06F 16/248* (2019.01)
*G06F 16/21* (2019.01)
*G06F 16/2457* (2019.01)
*G06Q 30/02* (2012.01)

(52) U.S. Cl.
CPC .......... *G06F 16/248* (2019.01); *G06F 16/212* (2019.01); *G06F 16/24573* (2019.01); *G06F 16/24575* (2019.01); *G06Q 30/0263* (2013.01)

(58) Field of Classification Search
CPC ............. G06F 16/245; G06F 16/24575; G06F 16/248; G06F 16/3329; G06F 16/90324; G06F 21/36; G06F 3/0488; G06F 3/04847; G06F 3/04842; G06F 3/04817; G06F 8/38; G06F 17/212; G06Q 30/0263
See application file for complete search history.

(56) References Cited

U.S. PATENT DOCUMENTS

| | | | |
|---|---|---|---|
| 9,361,005 B2 | 6/2016 | Wheatley | |
| 9,820,004 B1 | 11/2017 | Foerster et al. | |
| 10,592,098 B2 | 3/2020 | Chaudhri et al. | |
| 10,636,187 B2 | 4/2020 | Ahuja | |
| 10,943,380 B1 | 3/2021 | Bennah et al. | |
| 2011/0078786 A1 | 3/2011 | Kwong et al. | |
| 2013/0145280 A1 | 6/2013 | Green | |
| 2013/0198004 A1 | 8/2013 | Bradley | |
| 2013/0346877 A1* | 12/2013 | Borovoy | G06Q 10/10 715/753 |
| 2014/0181910 A1 | 6/2014 | Fingal | |

(Continued)

FOREIGN PATENT DOCUMENTS

WO 2015022409 A1 2/2015

*Primary Examiner* — Yuk Ting Choi
(74) *Attorney, Agent, or Firm* — Haley Guiliano LLP

(57) ABSTRACT

Methods and systems for presenting contextually relevant push content when a user is passively engaged with an application are described herein. The system detects that the user is engaged with an application on a device and monitors the user's level of engagement with the application. If the system determines that the user is passively engaged, the system prepares to insert push content into the current output. The system identifies a region on the current output into which to insert push content, for example a region unoccupied by content or a particular object. The system identifies a context of the current output and selects a push content item based on the context of the current output. Then, the system inserts the push content item into the empty region on the current output.

18 Claims, 21 Drawing Sheets

(56) References Cited

U.S. PATENT DOCUMENTS

| | | |
|---|---|---|
| 2014/0278998 A1 | 9/2014 | Systrom |
| 2014/0337868 A1 | 11/2014 | Garza et al. |
| 2015/0100646 A1 | 4/2015 | Lavji |
| 2015/0134318 A1* | 5/2015 | Cuthbert ................. G06F 40/47 704/2 |
| 2015/0262229 A1 | 9/2015 | Brenner |
| 2016/0034152 A1 | 2/2016 | Wilson |
| 2016/0196052 A1 | 7/2016 | Franklin |
| 2016/0259526 A1 | 9/2016 | Lee et al. |
| 2017/0053542 A1* | 2/2017 | Wilson .................... G09B 5/02 707/999.003 |
| 2017/0075878 A1* | 3/2017 | Jon .................. H04M 1/72436 707/999.003 |
| 2017/0123823 A1 | 5/2017 | Zheng |
| 2017/0286366 A1 | 10/2017 | Chang |
| 2017/0308289 A1* | 10/2017 | Kim ...................... G06F 16/532 707/999.003 |
| 2018/0005279 A1 | 1/2018 | Battaglini |
| 2018/0040020 A1 | 2/2018 | Kurian |
| 2018/0083898 A1* | 3/2018 | Pham .................... G06F 40/274 707/999.003 |
| 2018/0188905 A1 | 7/2018 | Tran et al. |
| 2018/0276721 A1 | 9/2018 | Krauss |
| 2018/0276871 A1 | 9/2018 | Kolli |
| 2018/0295072 A1 | 10/2018 | Yim |
| 2018/0300751 A1 | 10/2018 | Hammitt et al. |
| 2018/0373405 A1* | 12/2018 | Donahue ............... G06F 16/435 707/999.003 |
| 2021/0049801 A1 | 2/2021 | Bennah et al. |
| 2021/0051122 A1 | 2/2021 | Bennah et al. |
| 2021/0280181 A1 | 9/2021 | Saito et al. |

\* cited by examiner

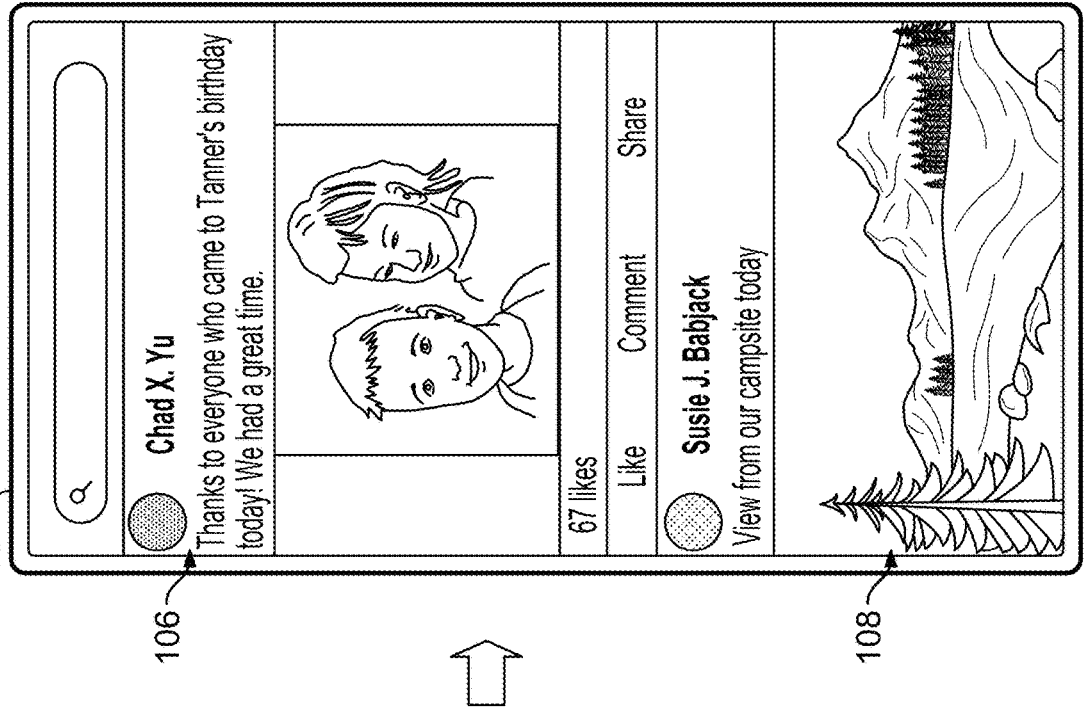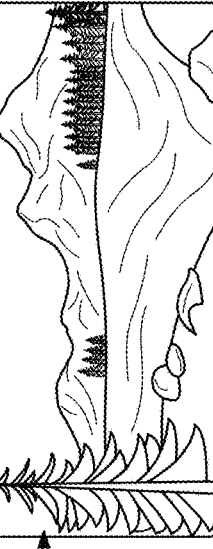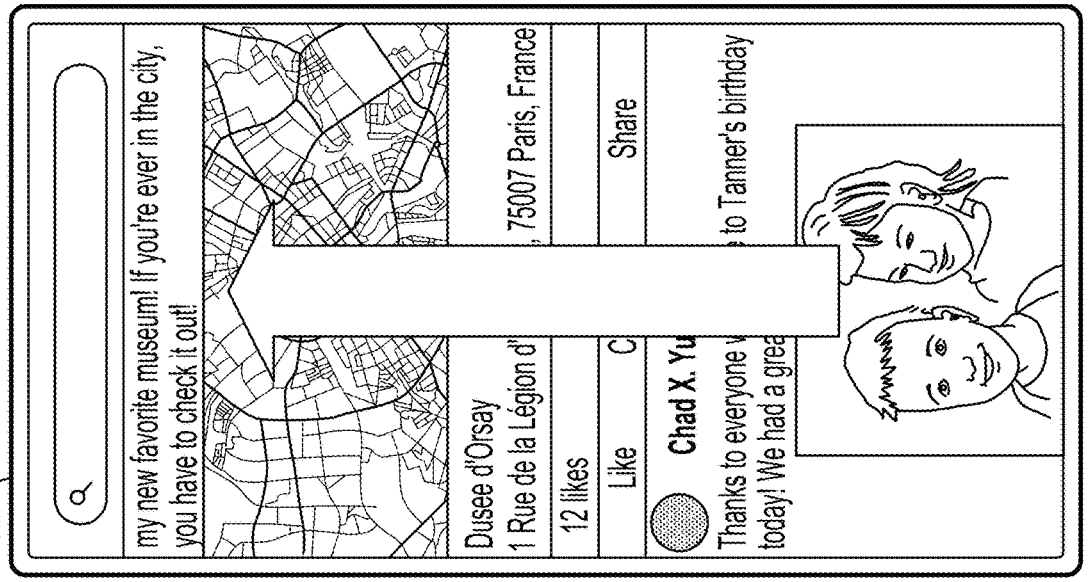
FIG. 1

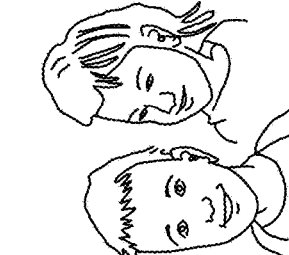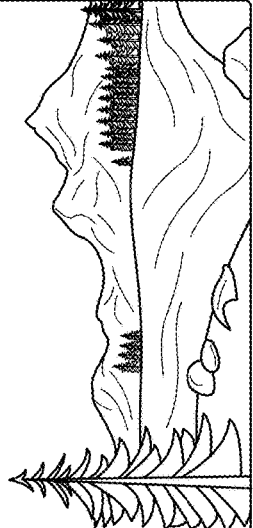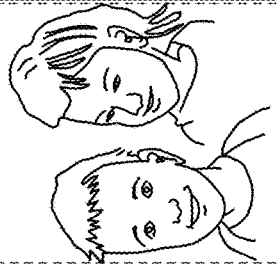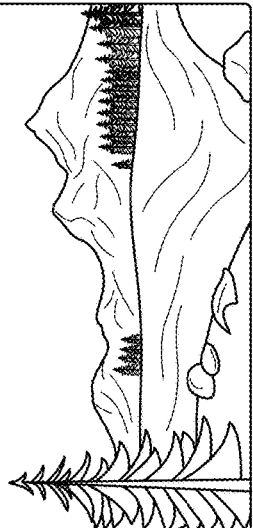
FIG. 2

1900

1902
Identify an Object on a Current Display of an Application

1904
Access a Database of Animated Push Content Items

1906
Select an Animated Push Content Item Having an Animated Graphic Element from the Database 1908
Insert the Animated Push Content Item at an Insertion Point in the Current Display 1910
Move the Animated Graphic Element on the Current Display 1912
Cause at Least One Interaction of the Animated Graphic Element with the Object on the Current Display

2102
Access Metadata of the Animated Graphic Element of the Animated Push Content Item 2104
Extract Spatial Information of the Animated Graphic Element from the Metadata 2106
Aligning Spatial Points from the Spatial Information with One or More Display Points on the Current Display 2108
Extract Interactive Information of the Animated Graphic Element from the Metadata 2110
Identify a Spatial Point that Corresponds to at Least One Interaction Based on the Interactive Information 2112
Identify a Display Point that Corresponds to the Spatial Point 2114
Modify the Object at the Display Point According to the at Least One Interaction

FIG. 21

SYSTEMS AND METHODS FOR PUSHING CONTENT

BACKGROUND

The present disclosure is directed to pushing content and, more particularly, to pushing content based on engagement level, type of content to be pushed, or animated element.

SUMMARY

Pushing content facilitates communications by providing personalized, specific content which is easily understandable. One example is push notifications, which include specific information that needs to be communicated. Other examples include memes, gifs, texts, photos, videos and other types of content. In some embodiments, this invention assumes the current content on the user's device shapes the way the user will perceive and respond to pushed content. Therefore, much pushed content is ineffective due to current systems, which lack the ability to monitor a user's engagement with a device when determining whether to present push content at that time. The user's ability to receive and easily understand messaging is directly related to the user's level of engagement at the time content is pushed. For example, current systems may not monitor whether the user is actively or passively engaged with content on the device or whether the user has completely disengaged from content on the device. The inability of current systems to track this activity results in a failure of some pushed content to successfully facilitate communications with the user.

Solutions to the problem described above include presenting contextually relevant push content when a user is passively engaged with an application and therefore most receptive to communications (e.g., messaging). The system may monitor an engagement level of the user with an application on a device. If the user is disengaged from the application, the system may determine that it is not an optimal time to deliver push content, as the user will likely not be receptive. If the user is actively engaged with the application (e.g., scrolling, typing, browsing, playing a game, etc.), the system may determine that it is not an optimal time because the user is too absorbed with the application and will likely have a negative response to a potentially disruptive push content item. If the user is passively engaged with the application, the system may determine that it is an optimal time to deliver a push content item.

In some embodiments, the system may identify an appropriate region on the output and a context of the current output. The system may then select a push content item based on the context of the current output. This ensures that the push content item is relevant to what the user is seeing on the device and increases the likelihood that the push content item will be effective in communicating to the user. For example the push content item may be a similar theme, topic, genre, type, application, etc. or illicit a similar emotion, reaction, interaction, experience, etc. The push content item may additionally be selected based on user profile information in order to facilitate understanding.

Another shortcoming of current push content systems is the inability to select an optimal type of push content to present to the user based on the content that the user is currently consuming (e.g., viewing, listening, feeling, etc.). The content that the user is currently engaged with can be a more important indicator for a message reception than more traditional systems, which may use information relating to historical user behavior when determining which push content item to present. For example, push content may be consistent with a user's viewing history but may be presented at an inappropriate time based on the current content that the user is engaged with on the device. This will result in a negative response to the push content item by the user. Without tracking the current content on the user's device, including, for example, a type of application, communications with other users, and content being output, current systems are unable to provide relevant push content that is curated in real time for the immediate content the user is consuming.

Solutions to the problem described above include selecting a type of push content to present to the user based on user preference information and a content context of the current device. The system may identify a context of the current device, which may include a type of the application that the user is engaged with, an audio genre or type (e.g., audio book or music), a tone of the current output, keywords and images on the current output, and any other relevant information on the current device. The information identified on the current device informs the system as to which type of push content is appropriate for the present situation. In some embodiments, the system then extracts user preference information about the user from a user profile in order to determine whether the user prefers or dislikes a particular type of push content. The system finally selects a type of push content based on the user's preferences and the context of the current device and inserts push content of the selected type into the current device. This increases the chances that the system is providing the user with the most appropriate type of push content in the appropriate contexts to facilitate a positive engagement by the user (e.g., communication).

Yet another shortcoming of current push content systems is the inability to present push content that seamlessly integrates and compliments the content that the user is engaged with. Currently, push content is overlaid onto the user's output in a way that is easily ignored or overlooked. Current push content, even if it is able to move in relation to the user's output, is not able to cause changes to the content on the user's device. Therefore, there exists a perception gap between push content inserted into the display or audio track and the content with which the user is engaged. Push content in current systems often fails to grab the attention of users because it lacks the functionality that interacts with and/or alters the existing content.

A solution to the problem described above is to enable push content to interact with the current content with which the user is engaged. By bridging the gap between the push content being presented and the content already on the device, push content can become more integrated with the user's device experience and more effectively capture the user's attention to facilitate positive engagement, such as communication. In order to do this, push content having dynamic graphic and/or elements may be inserted into the user's content. The push content may be in the form of augmented or mixed reality content, animated content, interactive content, video or image content, notification, audio content, memes, gifs, audio content, etc. The motions and actions of the animated graphic elements within the push content may be aligned with objects that are already on the screen, such as text and/or graphical representations. Therefore, the system may cause an interaction between the animated graphic element of the push content item and the objects already appearing on the screen. This causes the user's current output to become dynamically influenced by the addition of the push content. Such a dynamic output fully integrates the push content with the user's current output. Similarly, the system may insert audio content that compliments the current audio content, for example, adding communicative sound effects or jingles, adding comments to an audio book, adding a new lyric at the end of a song, or embellishing displayed text or graphics with audio content.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 shows illustrative displays comprising an application with which a user is engaged, in accordance with some embodiments of the disclosure;

FIG. 2 shows illustrative displays illustrating the insertion of push content into a region of an application with which a user is passively engaged, in accordance with some embodiments of the disclosure;

FIG. 19 is a flowchart of an illustrative process for inserting a dynamic push content item into content, in accordance with some embodiments of the disclosure;

FIG. 21 is a flowchart of an illustrative process for inserting a push content item into a current output by matching spatial points of the push content item with display points of the current output, in accordance with some embodiments of the disclosure.

DETAILED DESCRIPTION

Figure 3:
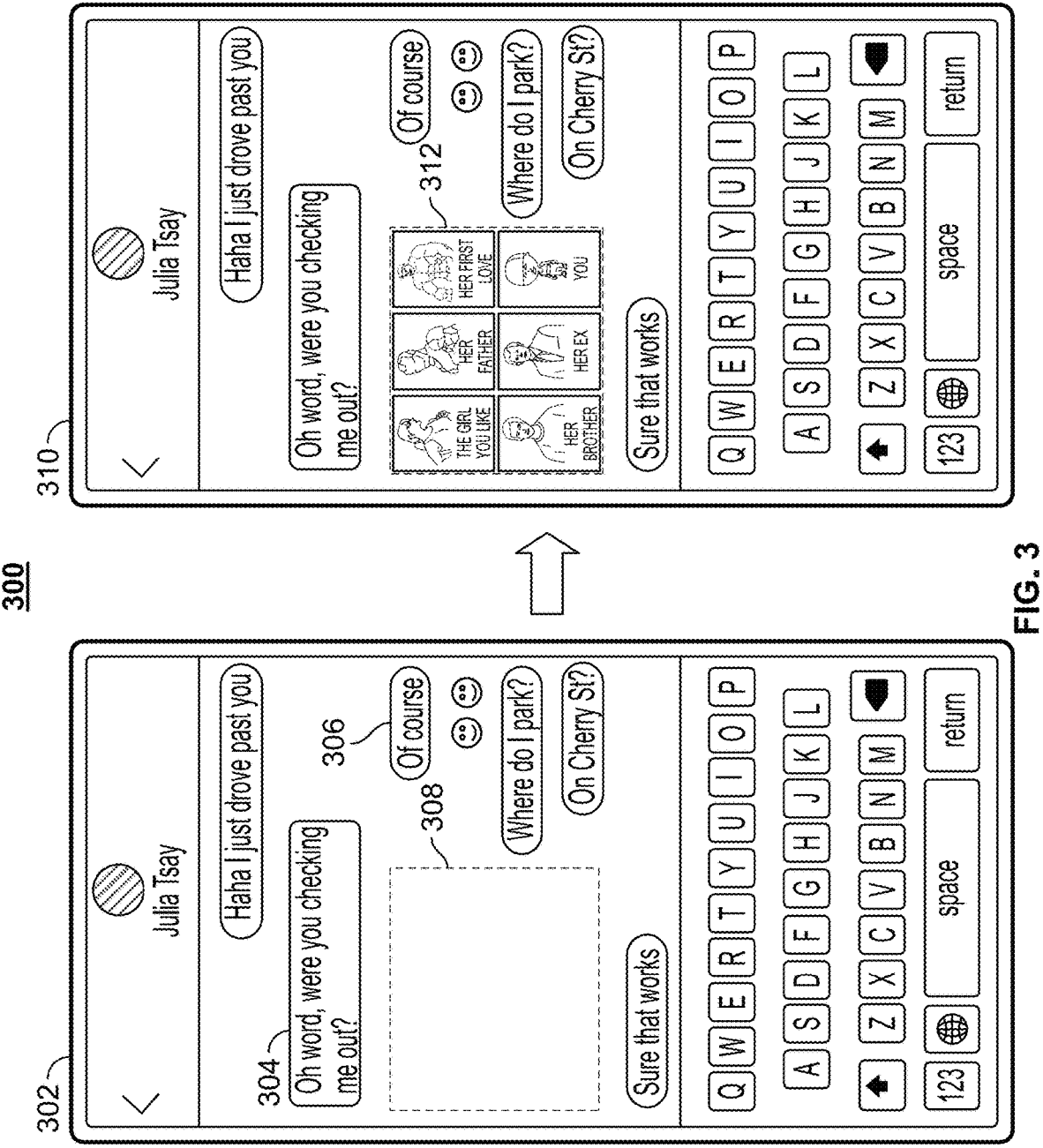
FIG. 3 shows illustrative displays illustrating the insertion of a contextually relevant push content item into a communications application, in accordance with some embodiments of the disclosure.

Methods and systems are described herein for inserting push content into an application providing the output on a user's device. In some embodiments, the system may insert push content (e.g., visual notifications, audio, and other content) into an application when a user is not fully engaged (i.e., passively engaged or intermittently engaged) with the application. The system may determine an optimal moment at which to present push content to a user and may insert push content into, for example, a suitably unoccupied region on the display of the current output. In some embodiments, the system may determine an optimal moment at which to output audio push content to the user. In some embodiments, the system may curate the push content item such that the push content item matches the context of the current output.

In some embodiments, the system determines a type of push content to insert into a current output. The system may determine that certain types of push content are more appropriate in certain contexts, and may therefore select the type of push content based on the context of the current output. In some embodiments, the system may determine, e.g., from profile information, that different users are more receptive to different types of push content and may therefore select the type of push content based on user profile information, such as user preference information, from a user profile of the user.

In some embodiments, the system inserts an animated push content item into an output. The system may identify an object in the current output, which may be text or a graphical representation. The system may select an animatable push content item which interacts with the object in the current output. For example, the animated push content item may appear to move the object or change the appearance of the object when it is animated in the output.

FIG. 1 shows illustrative displays 100 comprising an application running on a user device with which a user is engaged, in accordance with some embodiments of the disclosure. In display 102, the user is actively scrolling upward through a media feed. The user scrolls past content but does not pause for a significant time on any specific content item. The system may determine that the user's engagement level is active. Because the user is actively engaged with the content, the system may determine that it is not an opportune time to output push content to the user. In display 104, the user has stopped scrolling and has paused for a significant period at a current output on the media feed. The system may determine how long the user pauses at the current output. In some embodiments, the system may compare the elapsed time to a set period. The system may set a period in order to determine that the user is no longer actively engaged with the application once it is exceeded and is now no longer sufficiently actively engaged with the application. The system may, additionally or alternatively, set a longer time as a default signifying that the lack of interaction with the application is not complete disengagement from the application. If the elapsed time falls between the minimum and maximum time, the system may determine that the user is passively engaged with the application.

In some embodiments, once the system determines that the user is passively engaged with the application, the system may determine a context of the current output of the application. For example, the system may identify content that is visible on the current output. In display 104, there are two postings visible on the current output (e.g., posting 106 and posting 108). In some embodiments, the system may determine the context of a portion of the current output. For example, the system may prioritize any postings that are fully visible on the current output. In display 104, posting 106 is fully visible while posting 108 is only partially visible because it is cut off by the bottom of the display. This indicates that the user's primary focus is on posting 106 and therefore the system may prioritize posting 106 for deriving a context. In some embodiments, the system may prioritize a posting or postings toward the top of the screen or in the middle of the screen. In display 104, the system may determine that the user has focused on posting 106 because it is toward the top of the current output. Therefore, the system may prioritize posting 106. In some embodiments, the system may extract keywords, images, metadata, or other information from the prioritized posting in order to determine the context of that portion of the current output. The system may then use the context to select a relevant push content item for insertion into the current output, as will be discussed further in relation to FIG. 2.

FIG. 2 shows illustrative displays 200 illustrating the insertion of push content into a region of an application with which the user is passively engaged, in accordance with some embodiments of the disclosure. For example, the region may be unoccupied by content or at least content relevant to the context. Display 202 shows the current output of an application with which the user is determined to be passively engaged. In some embodiments, the system may identify empty regions on the current output, i.e., regions not containing words, images, links, or other visual or substantive information. For example, the system may identify so called "empty" (i.e., unoccupied) regions 206, which are spaces peripheral to the object of an image included in posting 204 (which corresponds to posting 106). Thus, it will be understood that spaces (i.e., unoccupied) can include spaces having a background color, texture, or image. Display 212 shows the insertion of push content (e.g., push content item 210) into empty regions 206. In some embodiments, the system may select the push content item 210 based on the context of a portion of the current output (e.g., as discussed in relation to FIG. 1). For example, the system may extract keywords and images from posting 208. In this example, the system may identify the keyword "birthday." The system may then search a database of push content for push content relating to "birthday." The system may identify push content 210 for "E-CARD." The push content item 210 for "E-CARD" may mention "birthday" in the push content item and may, additionally or alternatively, include a tag for "birthday" in the metadata for the push content item. Therefore, the system may insert the push content item 210 into the empty regions 206. In some embodiments, push content may include notifications, audio content, advertising, promotions, offers, announcements, informational content, or other content that is pushed to a user.

While FIGS. 1 and 2 show when and where to insert push content, FIG. 3 shows a determination of which type of push content to insert. FIG. 3 shows illustrative displays 300 illustrating the insertion of a contextually relevant push content item into a communications application, in accordance with some embodiments of the disclosure. Display 302 shows a display of a communications application on a device. The utilization of the communications application comprises messages between the user of the device and another user of another device. In some embodiments, the system may determine whether there is room to insert push content into the current output. In this example, the system may identify region 308 as available for push content insertion.

In some embodiments, the system determines a context of the current output by analyzing keywords or images on the current output. In this example, the system may comprise an algorithm to analyze the content of the text messages between the two users. For example, the messages (e.g., messages 304 and 306) indicate that the relationship between the two users is familiar and that the tone is lighthearted. Specifically, the two users are flirting with each other. The system may therefore determine that a certain type of notification, audio content item, meme, GIF, or animated push content item would be appropriate as relevant in the context of this scenario. Therefore, the system may search a database of push content for a notification, audio content item, meme, GIF, or animated push content item that is relevant to the context of the text conversation. In display 310, the system has inserted push content item 312. Push content item 312 is push content for the Avengers and includes various characters from the Avengers. The push content item is about someone having a crush on a girl, which matches the context of the text conversation. The push content item is therefore contextually relevant to the current output.

Figure 4:
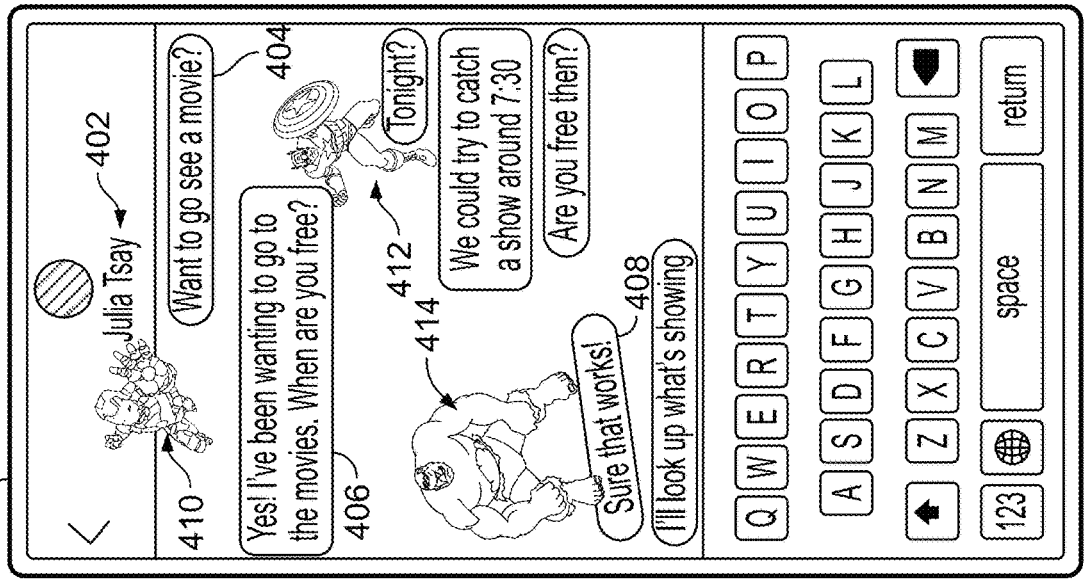
FIG. 4 shows an illustrative display comprising an animated push content item inserted into a communications application, in accordance with some embodiments of the disclosure.

In some embodiments, a push content type is inserted that interacts with content on the display. For example, FIG. 4 shows an illustrative display 400 comprising an animated push content item inserted into a communications application, in accordance with some embodiments of the disclosure. Display 400 shows a communications application on a device 416 in which the user of the device is are exchanging text messages with a user of another device. The system may identify a number of objects in the current output. For example, the system may identify the context name "Julia Tsay" at the top of the display (e.g., text 402). The system may additionally identify a number of text bubbles (e.g., text bubbles 404, 406, and 408). In some embodiments, the system may identify a context of the current output. For example, the system may determine, based on the light-hearted tone of the conversation and the familiar relationship between the two users, that an augmented reality (AR) animation push content item would be appropriate.

In some embodiments, the system identifies a context of the current output. The system may take into account the tone, relationship, and/or content of the conversation on the current output. The system may identify that the users are discussing going to the movies. The system may therefore search a database for animated push content of an animated push content item relating to a new movie that is in theaters. For example, the system may determine that the new Avengers movie is in theaters and may identify a number of Avengers characters in the animated push content database. The system may therefore insert an Ironman character (e.g., character 410), a Captain America character (e.g., character 412), and a Hulk character (e.g., character 414) into the current output. Each character may include an animated graphic element, such as a motion, a change, and/or a programmed interaction. Finally, the system may cause interactions between the characters and the objects on the current output. For example, character 410 pushes the name "Julia Tsay" (e.g., text 402) and topples the letters of the name over. The character 412 grabs hold of text bubble 406 and causes a crack to form in the text bubble. Character 414 stomps on text bubble 408 and knocks the bubble off balance. These interactions embed the push content item into the current output and make the push content item visually interesting to the user.

It will be understood that FIGS. 1-4 are shown for illustrative purposes and that not all of the features need to be included. In some embodiments, additional features may be included as well.

Figure 5:
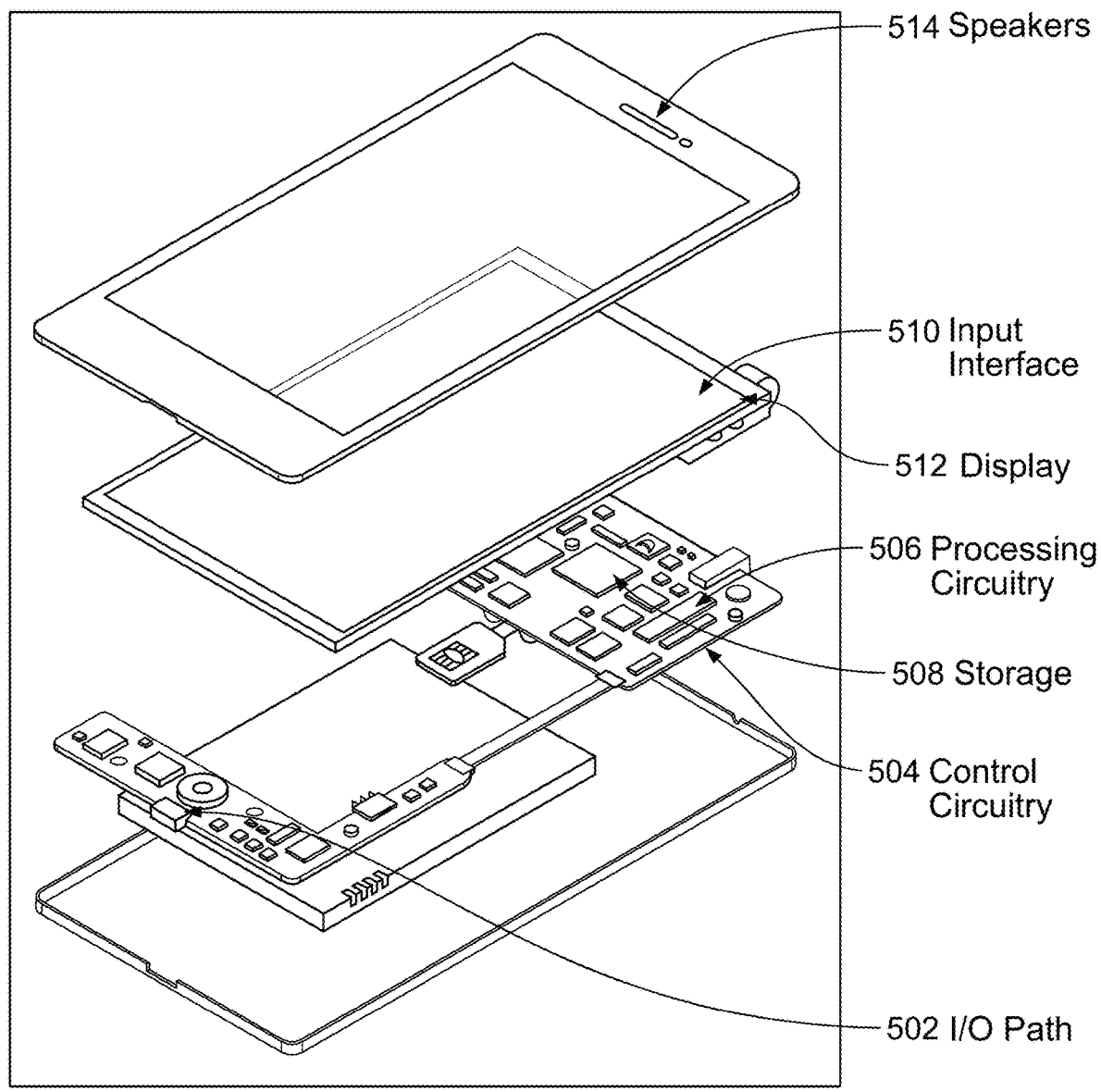
FIG. 5 is a block diagram of an illustrative device, in accordance with some embodiments of the present disclosure.

In some embodiments, the methods and systems described in connection with FIGS. 1-4 utilize a device on which to output the push content to the user. FIG. 5 is a block diagram of an illustrative device 500, in accordance with some embodiments of the present disclosure. As referred to herein, device 500 should be understood to mean any device that can display or output push content. As depicted, device 500 may be a smartphone or tablet, or may additionally be a personal computer or television equipment. In some embodiments, device 500 may be an augmented reality (AR) or virtual reality (VR) headset, smart speakers, or any other device capable of outputting push content to a user.

Device 500 may receive content and data via input/output (hereinafter "I/O") path 502. I/O path 502 may provide content (e.g., broadcast programming, on-demand programming, internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for generating for display push content based on settings stored in memory (i.e., storage 508).

An application on a device may be a stand-alone application implemented on a device and/or at least partially on a server. The application may be implemented as software or a set of executable instructions. The instructions for performing any of the embodiments discussed herein of the application may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 5 the instructions may be stored in storage 508, and executed by control circuitry 504 of device 500.

In some embodiments, an application may be a client-server application where only the client application resides on device 500 (e.g., device 602), and a server application resides on an external server (e.g., server 606). For example, an application may be implemented partially as a client application on control circuitry 504 of device 500 and partially on server 606 as a server application running on control circuitry. Server 606 may be a part of a local area network with device 602, or may be part of a cloud-computing environment accessed via the internet. In a cloud-computing environment, various types of computing services for performing searches on the internet or informational databases, gathering information for a display (e.g., information for adding push content to a display of an application), or parsing data are provided by a collection of network-accessible computing and storage resources (e.g., server 606), referred to as "the cloud." Device 500 may be a cloud client that relies on the cloud-computing capabilities from server 606 to gather data to populate an application. When executed by control circuitry of server 606, the system may instruct the control circuitry to generate for display the push content and transmit the push content to device 602. The client application may instruct control circuitry of the receiving device 602 to generate the push content for output. Alternatively, device 602 may perform all computations locally via control circuitry 504 without relying on server 606.

Control circuitry 504 may include communications circuitry suitable for communicating with a content server or other networks or servers. The instructions for carrying out the above-mentioned functionality may be stored and executed on server 606. Communications circuitry may include a cable modem, a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on server 606) may be used to supplement storage 508 or instead of storage 508.

Control circuitry 504 may include display-generating circuitry and tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 504 may also include scaler circuitry for upconverting and downconverting content into the preferred output format of the device 500. Circuitry 504 may also include digital-to-analog converter circuitry and analog-to-digital converter circuitry for converting between digital and analog signals. The tuning and encoding circuitry may be used by the device to receive and to display, to play, or to record content. The tuning and encoding circuitry may also be used to receive guidance data. The circuitry described herein, including for example, the tuning, audio generating, encoding, decoding, encrypting, decrypting, scaler, and analog/digital circuitry, may be implemented using software running on one or more general purpose or specialized processors. Multiple tuners may be provided to handle simultaneous tuning functions. If storage 508 is provided as a separate device from device 500, the tuning and encoding circuitry (including multiple tuners) may be associated with storage 508.

A user may send instructions to control circuitry 504 using user input interface 510 of device 500. User input interface 510 may be any suitable user interface touchscreen, touchpad, or stylus and may be responsive to external device add-ons such as a remote control, mouse, trackball, keypad, keyboard, joystick, voice recognition interface, or other user input interfaces.

User input interface 510 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Speakers 514 may be provided as integrated with other elements of device 500 or may be stand-alone units. Display 512 may be used to display visual content while audio content may be played through speakers 514. In some embodiments, the audio may be distributed to a receiver (not shown), which processes and outputs the audio via speakers 514.

Control circuitry 504 may enable a user to provide user profile information or may automatically compile user profile information. For example, control circuitry 504 may track user preferences for different push content and types of push content. In some embodiments, control circuitry 504 monitors user inputs, such as queries, texts, calls, conversation audio, social media posts, etc., from which to derive user preferences. Control circuitry 504 may store the user preferences in the user profile. Additionally, control circuitry 504 may obtain all or part of other user profiles that are related to a particular user (e.g., via social media networks), and/or obtain information about the user from other sources that control circuitry 504 may access. As a result, a user can be provided with a personalized push content experience.

Figure 6:
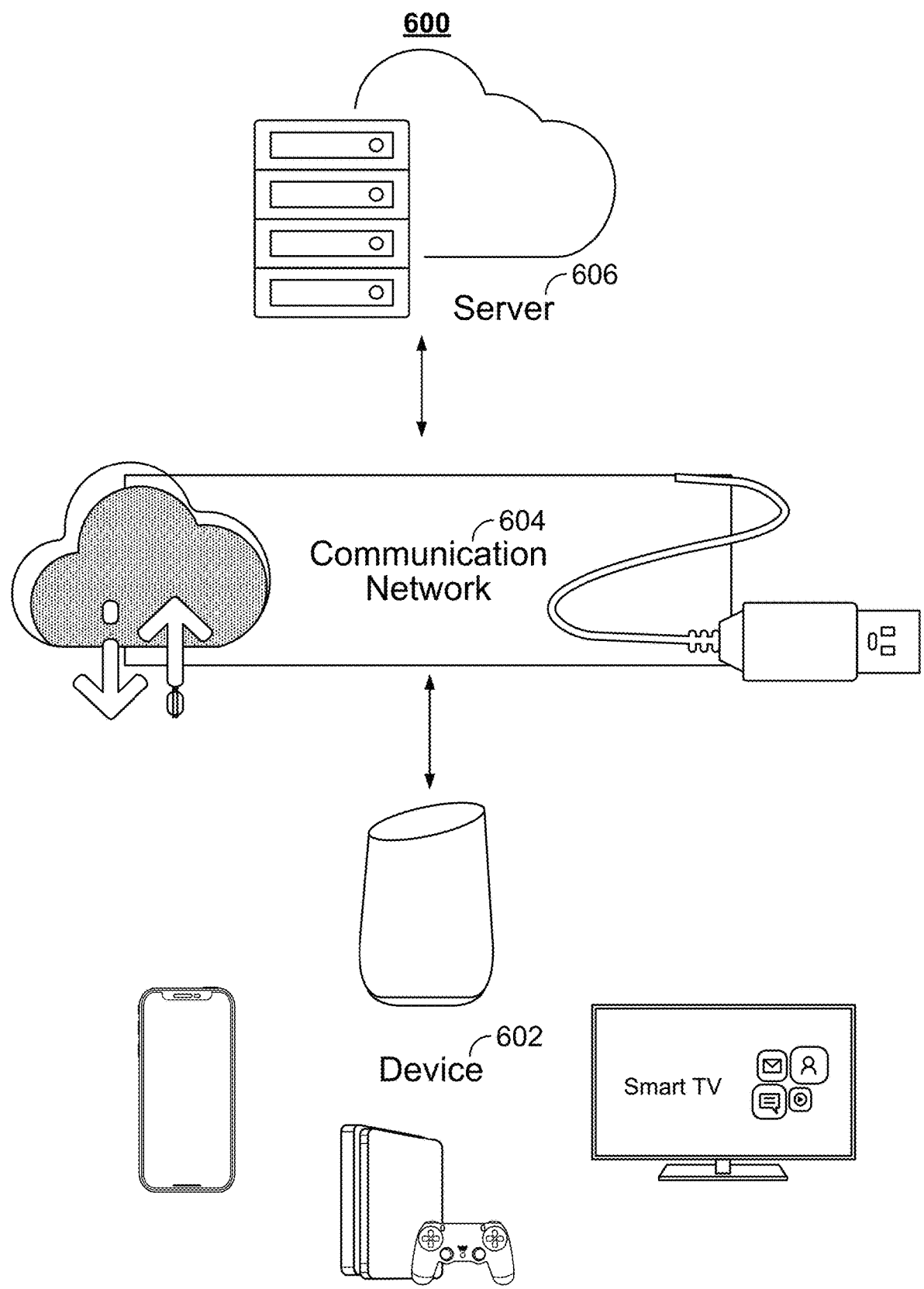
FIG. 6 is a block diagram of an illustrative system, in accordance with some embodiments of the disclosure.

Device 500 of FIG. 5 can be implemented in system 600 of FIG. 6 as device 602. Devices from which push content may be output may function as stand-alone devices or may be part of a network of devices. Various network configurations of devices may include a smartphone or tablet, or may additionally include a personal computer or television equipment. In some embodiments, device 602 may be an augmented reality (AR) or virtual reality (VR) headset, smart speakers, or any other device capable of outputting push content to a user.

In system 600, there may be multiple devices but only one of each type is shown in FIG. 6 to avoid overcomplicating the drawing. In addition, each user may utilize more than one type of device and also more than one of each type of device.

As depicted in FIG. 6, device 602 may be coupled to communication network 604. Communication network 604 may be one or more networks including the internet, a mobile phone network, mobile voice or data network (e.g., a 4G or LTE network), cable network, public switched telephone network, Bluetooth, or other types of communications network or combinations of communication network. Thus, device 602 may communicate with server 606 over communication network 604 via communications circuitry described above. In should be noted that there may be more than one server 606, but only one is shown in FIG. 6 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communications path or combination of such paths. Further details of the present disclosure are discussed below in connection with the flowcharts of FIGS. 7-22.

Figure 7:
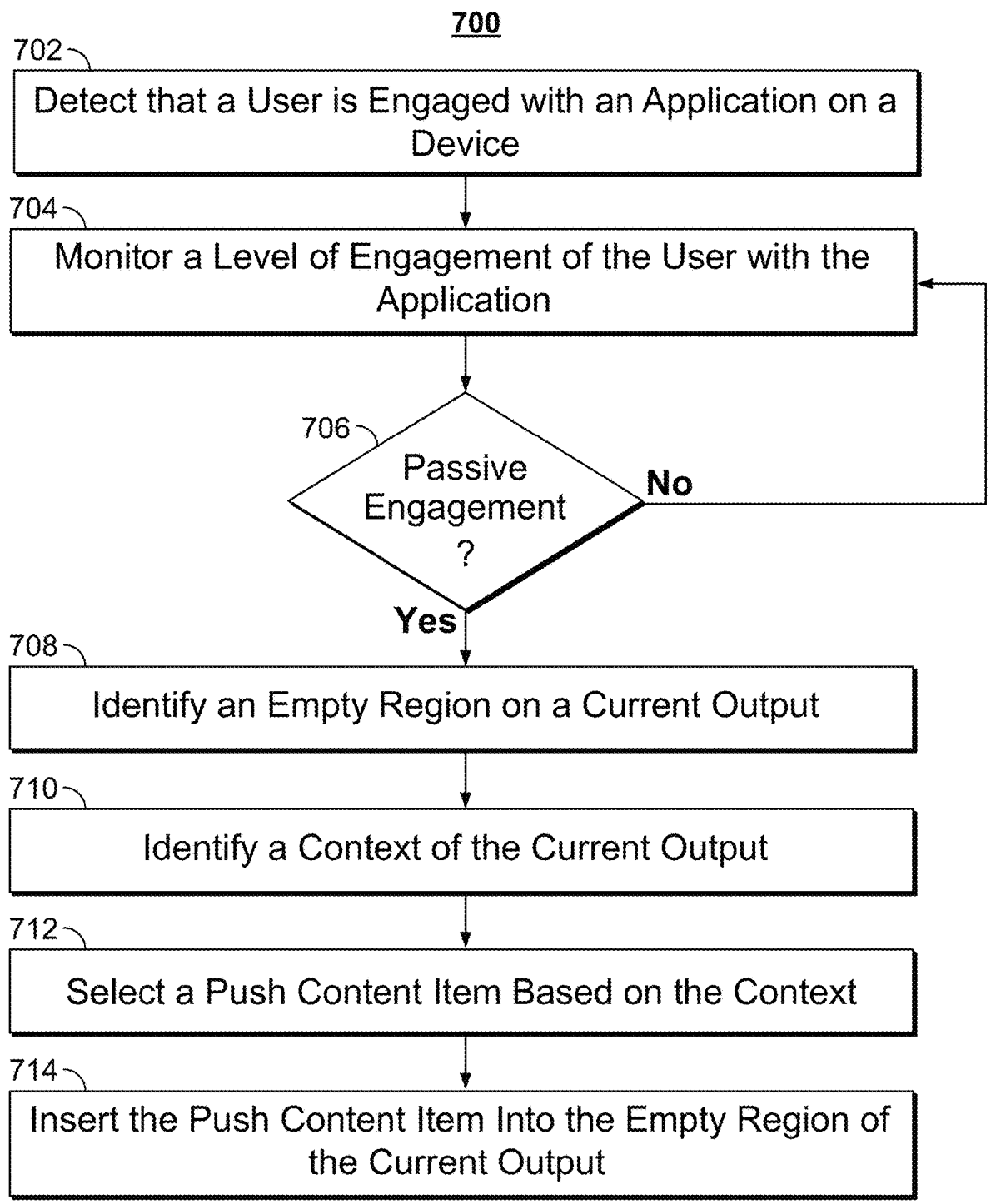
FIG. 7 is a flowchart of an illustrative process for presenting contextually relevant push content when a user is passively engaged with an application, in accordance with some embodiments of the disclosure.

FIG. 7 is a flowchart of an illustrative process 700 for presenting contextually relevant push content when a user is passively engaged with an application or disengaged from the application, in accordance with some embodiments of the disclosure. As shown in FIG. 7, process 700 determines a level of engagement of the user with an application on a device. If the system determines that the level of engagement is passive, the system may insert push content into an empty region of the current output. By inserting push content into the output presented to the user when the user is passively engaged with the output, the system is aiming to capture the user's attention without detracting from any active engagement.

At step 702, the system (e.g., control circuitry 504) detects that a user is engaged with an application on a device. For example, the system may detect that the application is open on the device (e.g., device 500 or device 602). In some embodiments, the application may be open but not visible on the screen. In some embodiments, the application may be open but may no longer be outputting content (e.g., if a movie or song has ended). In both of these examples, the system may determine that the user is no longer engaged with the application. As another example, an application may be open but the user may not have interacted with the application for a certain period. An interaction with the application may include inputting a gesture or tap via a touchscreen on the device (e.g., input interface 510), typing on a keyboard, pressing a volume or home button on the device, inputting a voice command, or any other form of input. The system may use a threshold period since the user's most recent interaction with the application to identify when a user can be deemed to be no longer engaged. The threshold period may vary based on the type of application.

At step 704, the system monitors a level of engagement of the user with the application. In some embodiments, the system may track the actions performed by a user and the types of actions performed by a user. The types of actions may vary based on the type of application. For example, if the user is engaged in reading a news application, the system may use scrolling as an indication of engagement. In some embodiments, the system may create a log of actions along with time stamps. In some embodiments, the system may simply track the amount of time that has elapsed since the most recent user input.

At step 706, the system determines whether the user is passively engaged with the application. For example, if the user is engaged with a news application, the system may determine whether the user is presently scrolling or if the user has not scrolled for a certain time.

If the user is not presently scrolling, the system may determine that once a certain period (e.g., ten seconds) has passed, the user is deemed passively engaged with the news application. In another example, if the user is playing a video game on the device, the system may determine that the user is passively engaged with the application once the user has not interacted with the game for a certain period (e.g., five seconds). In another example, if the user is listening to a song on the device, the system may determine that the user is passively engaged with the application once the user has not interacted with the application for a certain period (e.g., equal to half the length of the song). If the user is not passively engaged with the application, process 700 returns to step 704 and the system continues to monitor the user's level of engagement. If the user is passively engaged with the application, process 700 continues at step 708.

At step 708, the system identifies an empty region on the current output. In some embodiments, the system may determine that an empty region is any region on the current output which does not contain any text, images, videos, or other objects. In some embodiments, the system may determine that certain pieces of text, images, videos, or other objects are part of the background. Thus, in some embodiments, the system may identify an empty region as any region not containing any foreground objects. In some embodiments, the system may identify an empty period in a current audio output of the device. For example, if the user is listening to a podcast, the system may identify a portion of the podcast which outputs only background music.

At step 710, the system identifies a context of the current output. To determine the context, the system may analyze keywords or images on the current output. Additionally or alternatively, the system may access a user profile. In some embodiments, the context may be based upon the type of application that the user is engaged with. In some embodiments, the context may be based upon an other user that the user is communicating with via the application. In some embodiments, the system may identify a context of a current audio output. For example, the system may analyze music, words, and metadata of the current audio output to determine the context. Processes for determining the context of the current output will be discussed in greater detail in relation to FIGS. 9-12.

At step 712, the system selects push content based on the context identified in step 710. The system may retrieve push content from a database (e.g., via server 606). In some embodiments, the system may compare the metadata of push content to keywords of the current output. In some embodiments, the system may compare images from the push content item to images or audio content of the current output. In some embodiments, the system may search for push content with a theme, tone, reference, or other element that is based on the current output. Methods of selecting push content based on the context of the current output will be discussed in greater detail in relation to FIGS. 9-12.

At step 714, the system inserts the push content item into the empty region of the current output. In some embodiments, the system may embed the push content item into the current output such that it moves with the output when the user navigates (e.g., scrolls) through a current page. In some embodiments, the push content item may overlay the current output and may stay stationary when user navigates (e.g., scrolls) through a current page. In some embodiments, the push content item may be temporary and may disappear after a predetermined time period. In some embodiments, the push content item may be persistent and may remain on the current output until the user closes the application. In some embodiments, the push content item may be an audio content item which is played over a current audio output. In some embodiments, the system may offer an option to the user to skip or hide the push content item, either immediately or after a certain time period.

It will be understood that process 700 is merely illustrative and that various modifications can be made in accordance with the present disclosure. For example, in some embodiments, step 710 is omitted and the selected push content item is not based on the context of the current output. As another example, in some embodiments, step 708 is omitted and the push content item is inserted in a predetermined location or on top of content.

Figure 8:
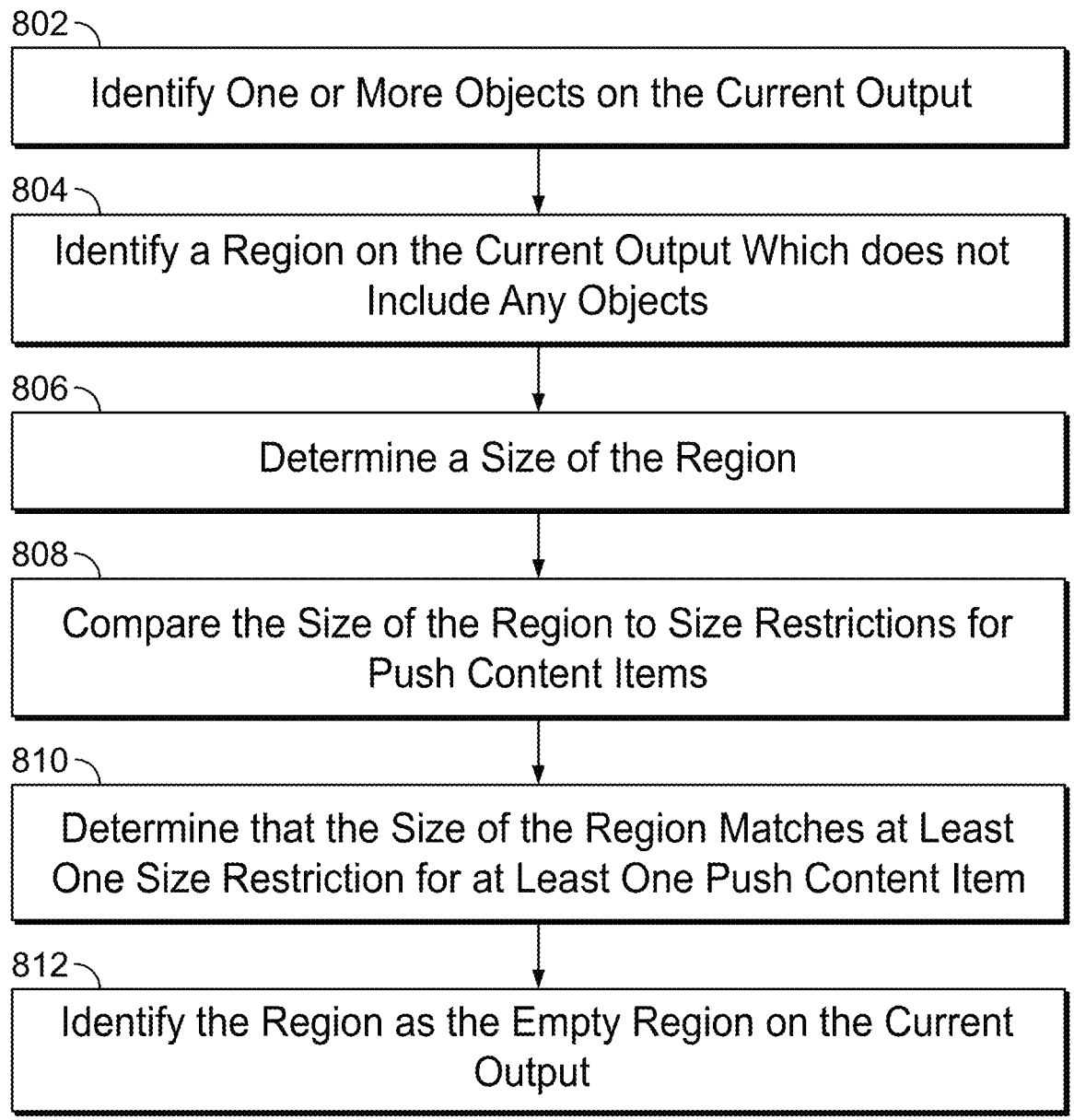
FIG. 8 is a flowchart of an illustrative process for identifying an unoccupied region in the current output, in accordance with some embodiments of the disclosure.

FIG. 8 is a flowchart of an illustrative process 800 for identifying an unoccupied region in a current output, in accordance with some embodiments of the disclosure. In some embodiments, process 800 can be used to perform step 708 of FIG. 7. As shown in FIG. 8, process 800 identifies a region on the current output not containing any objects. The system may then compare the dimensions of at least one push content item with size restrictions of the identified region. This enables the system to select push content which fits into the dimensions and size restrictions of the unoccupied region. This process further ensures that the push content item will be integrated seamlessly into the output, which creates a better push content experience for the user.

At step 802, the system identifies one or more objects on the current output. An object may be a piece of text or an image. In some embodiments, the system may identify only objects in the foreground and may disregard background objects or text. For example, the system may ignore a faded image that forms the backdrop of a website as an object on the output.

At step 804, the system identifies a region on the current output which does not include any relevant objects. In some embodiments, the system may identify a region not containing any objects in the foreground. The region may be a space between objects on the current output, a part of the screen not currently being used, or a part of the screen having only a background image or color. For example, in a communications application, any space not comprising a text bubble or contact name may be considered as not including any objects. In another example, in a news application, any space not comprising a title, news story, or accompanying images may be considered as not including any objects.

At step 806, the system determines a size of the region. The size of the region may include dimensions of the region in a unit of measurement, such as pixels. The size of the region may include the proportions, i.e., the ratio of the dimensions. In some embodiments, the system may identify the size of the region based on the smallest possible space between regions. For example, if a region is empty except for an object jutting into one side of the region, the system may measure a dimension up to the object. For example, as shown in FIG. 3, the system identifies a region that falls within the closest text bubbles. In some embodiments, the system may determine an entire shape of the region, such as an irregular shape, a circle, a rectangle, or any other shape, for example by analyzing the pixels utilized in displaying the object. In some embodiments, the system may identify only regions of a particular shape, such as a rectangle. Therefore, the system may identify only a portion of an empty region which aligns with the selected shape. The system may store the size and location of the region in local storage (e.g., storage 508).

At step 808, the system compares the size of the region to size restrictions for push content items. The system may retrieve metadata from the push content items to access size restrictions for each push content item. In some embodiments, the size restrictions specify a shape of the push content. In some embodiments, the size restrictions specify the dimensions or proportions of the push content. In some embodiments, the size restrictions specify a minimum size of the region on the output (e.g., if there is text in the push content item that must be large enough to read). In some embodiments, the size restrictions specify a maximum size of the region on the output (e.g., if the push content item has a low resolution).

At step 810, the system determines that the size of the region matches at least one size restriction for at least one push content item. For example, the system is able to identify push content comprising dimensions, proportions, resolution, or shape which comply with the identified region on the current output. In some embodiments, the system identifies a plurality of eligible push content items which match the size of the region. The system may further analyze the plurality of eligible push content items for push content items which match the context of the region.

At step 812, the system identifies the region as the unoccupied region on the current output. The system may then select push content of the plurality of eligible push content items for insertion into the unoccupied region.

It will be understood that process 800 is merely illustrative and that various modifications can be made in accordance with the present disclosure.

Figure 9:
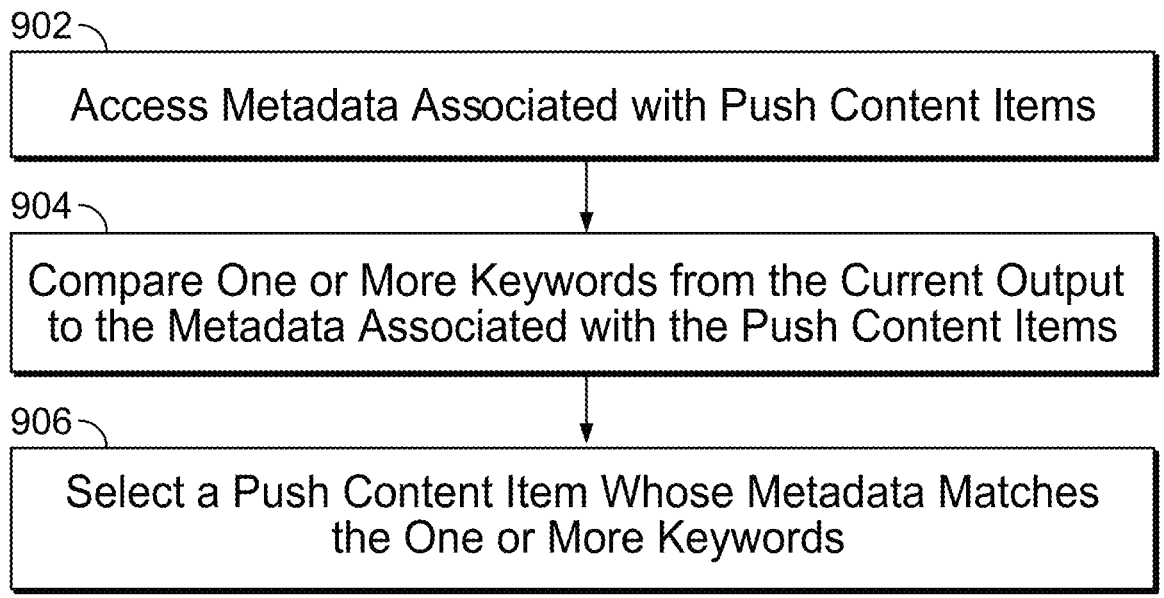
FIG. 9 is a flowchart of an illustrative process for identifying the context of the current output based on keywords, in accordance with some embodiments of the disclosure.
Figure 10:
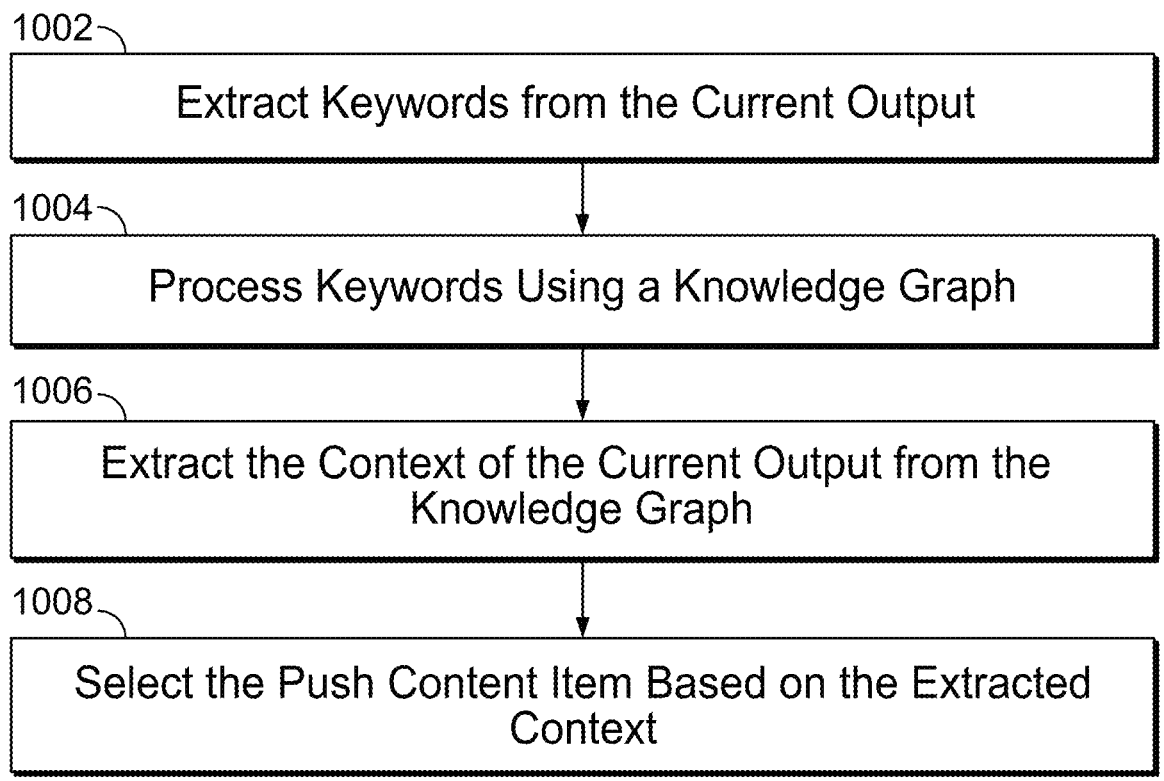
FIG. 10 is a flowchart of an illustrative process for identifying the context of the current output based on keywords and a knowledge graph, in accordance with some embodiments of the disclosure.

FIGS. 9 and 10 show illustrative embodiments of selecting contextually relevant push content items based on keywords on the current output. FIG. 9 is a flowchart of an illustrative process 900 for identifying the context of the current output based on keywords, in accordance with some embodiments of the disclosure. As shown in FIG. 9, process 900 compares keywords extracted from the current output to push content to identify a relevant push content item. This ensures that the user receives push content that is relevant to the user's immediate output, making it more interesting to the user. In some embodiments, process 900 can be used to perform steps 710 and 712 of FIG. 7.

At step 902, the system (e.g., control circuitry 504) accesses metadata associated with a plurality of push content items. The metadata of the push content items may include keywords, themes, tags, products, brands, target demographics, and related topics.

At step 904, the system compares one or more keywords extracted from the current output with the metadata associated with the push content items. The system may compare the keywords in the current output with keywords, themes, tags, products, brands, target demographics, and related topics in the metadata.

At step 906, the system selects push content whose metadata matches the one or more keywords. In some embodiments, the system may select push content whose metadata directly matches the keywords. In some embodiments, the system may search for metadata that is semantically related to the keywords. The system may therefore identify push content items that are relevant even if there is no direct match. The system may identify the push content item whose metadata comprises the closest match to the keywords on the current output.

It will be understood that process 900 is merely illustrative and that various modifications can be made in accordance with the present disclosure.

FIG. 10 shows other embodiments of selecting contextually relevant push content items based on keywords of the current output. FIG. 10 is a flowchart of an illustrative process 1000 for identifying the context of the current output based on keywords and a knowledge graph, in accordance with some embodiments of the disclosure. As shown in FIG. 10, process 1000 processes keywords using a knowledge graph to determine a context of the current output and selects push content based on the extracted context. The use of a knowledge graph enables the system to identify a more complex context of the current output, which enhances the system's ability to identify relevant push content items. In some embodiments, process 1000 can be used to perform steps 710 and 712 of FIG. 7.

At step 1002, the system extracts keywords from the current output. In some embodiments, the system may process any text on the output, interpret the text, and extract keywords. In some embodiments, the system may extract only keywords that are important to the current output as a whole (e.g., keywords that relate to the topic of a text conversation, a news article, a video, etc.).

At step 1004, the system processes keywords using a knowledge graph. In some embodiments, the system may identify nodes in a knowledge graph that correspond to the keywords. The system may then identify nodes connected to the keywords by edges in the knowledge graph. The system may additionally or alternatively identify nodes that connect the keyword nodes to each other in order to determine how the keywords are related.

At step 1006, the system extracts the context of the current output from the knowledge graph. For example, the system may identify connecting nodes, common nodes with many connections, or relevant periphery nodes in the knowledge graph based on the processing. By analyzing all of the nodes identified by the processing, the system may thereby determine a context of the current output based on the knowledge graph.

At step 1008, the system selects the push content item based on the extracted context. In some embodiments, the system may determine the extracted context based on the nodes identified during the processing. The system may then select push content which comprises metadata which matches, or at least generally conforms to, the identified nodes. In some embodiments, the system may select push content which comprises metadata matching the largest number of nodes identified during the processing. The system may additionally or alternatively select push content which comprises metadata matching peripheral nodes identified during the processing.

It will be understood that process 1000 is merely illustrative and that various modifications can be made in accordance with the present disclosure.

Figure 11:
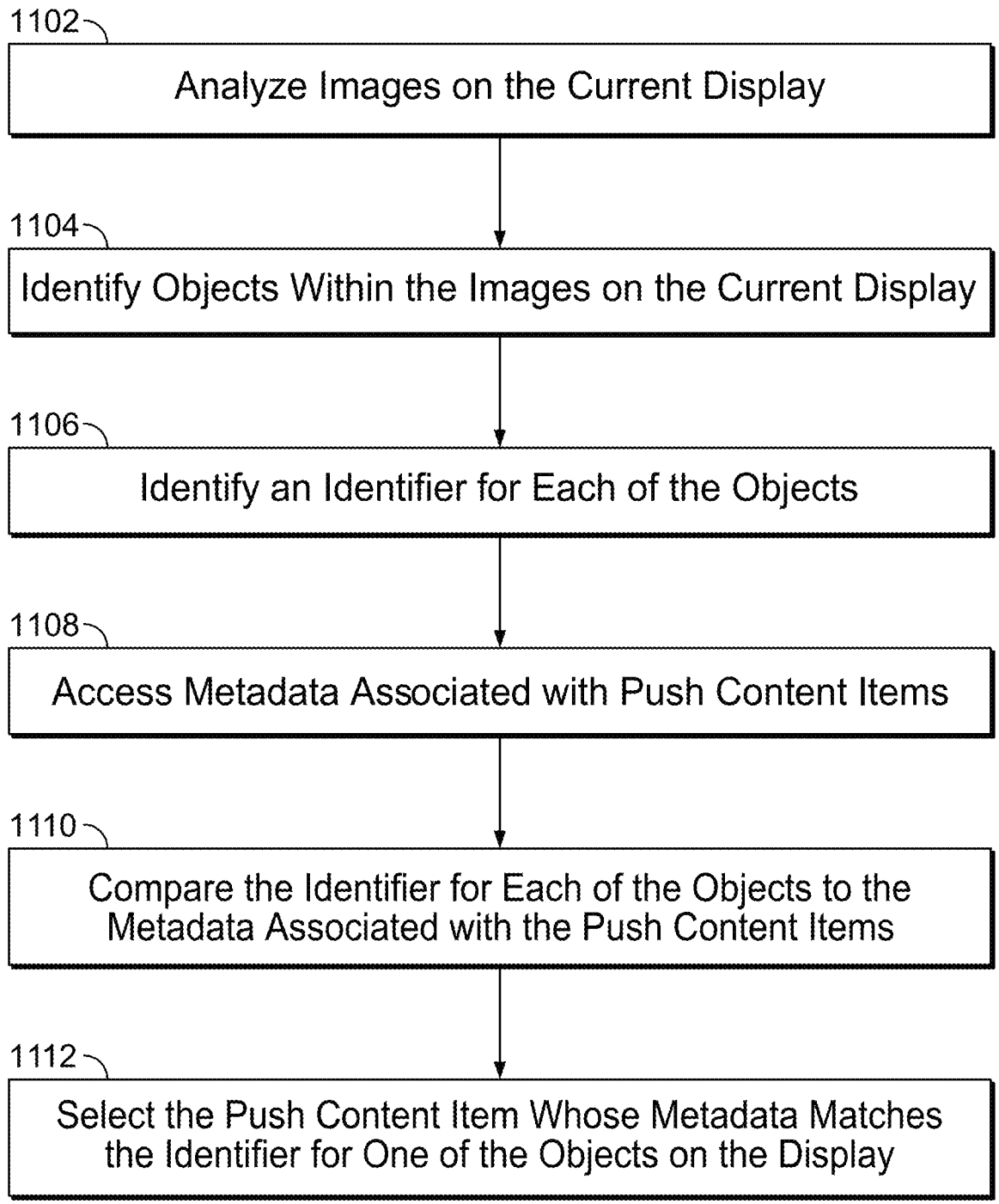
FIG. 11 is a flowchart of an illustrative process for identifying the context of the current output based on images on the current output, in accordance with some embodiments of the disclosure.

While FIGS. 9 and 10 show embodiments of selecting contextually relevant push content items based on keywords on the current output, push content items can also be selected to be contextually relevant based on images on the current output. FIG. 11 is a flowchart of an illustrative process 1100 for identifying the context of the current output based on images on the current output, in accordance with some embodiments of the disclosure. As shown in FIG. 11, process 1100 analyzes images on the current output and identifies objects within the images. The system then compares metadata from the push content items to these objects in order to select a relevant push content item. This process enables the system to provide the user with push content items that are relevant to images that the user is viewing on the current output. In some embodiments, process 1100 can be used to perform steps 710 and 712 of FIG. 7.

At step 1102, the system (e.g., control circuitry 504) analyzes images on the current output. In some embodiments, the system may additionally analyze videos on the current output. The system may perform a number of processes on the image or video, such as image segmentation, image comparisons, and object recognition. In some embodiments, the system may identify portions of the image or video that indicate the relevance of the image or video to the current output.

At step 1104, the system identifies objects within the images on the current output. In some embodiments, the system may identify objects within the portions of the image or video determined to be meaningful. In some embodiments, the system may identify all objects in the foreground of the image or video. In some embodiments, the system may identify objects in the video that match keywords from textual portions of the current output.

At step 1106, the system identifies an identifier for each of the objects within the images on the current output. For example, the system may identify the names of people who appear in the image or video. Additionally or alternatively, the system may identify any inanimate objects that appear in the image or video. The system may use techniques such as image segmentation, image comparison, and object recognition to identify each of the objects within the image or video.

At step 1108, the system accesses metadata associated with the push content items. The system may retrieve the push content items from a database (e.g., via server 606). The metadata of the push content items may include keywords, themes, tags, products, brands, target demographics, and related topics.

At step 1110, the system compares the identifier for each of the objects with the metadata associated with the push content items. The system may compare the identifier for each of the objects in the current output with keywords, themes, tags, products, brands, target demographics, and related topics in the metadata of the push content items.

At step 1112, the system selects the push content item whose metadata conforms to the identifier for one of the objects on the output. In some embodiments, the system may select push content whose metadata directly matches the identifier for one of the objects on the output. In some embodiments, the system may search for metadata that is semantically related to the identifier for one of the objects on the output. The system may therefore identify push content items that are relevant even if there is no direct match. The system may recognize conformity by identifying the push content item whose metadata comprises the closest match to the identifier for one of the objects on the current output.

It will be understood that process 1100 is merely illustrative and that various modifications can be made in accordance with the present disclosure.

Figure 12:
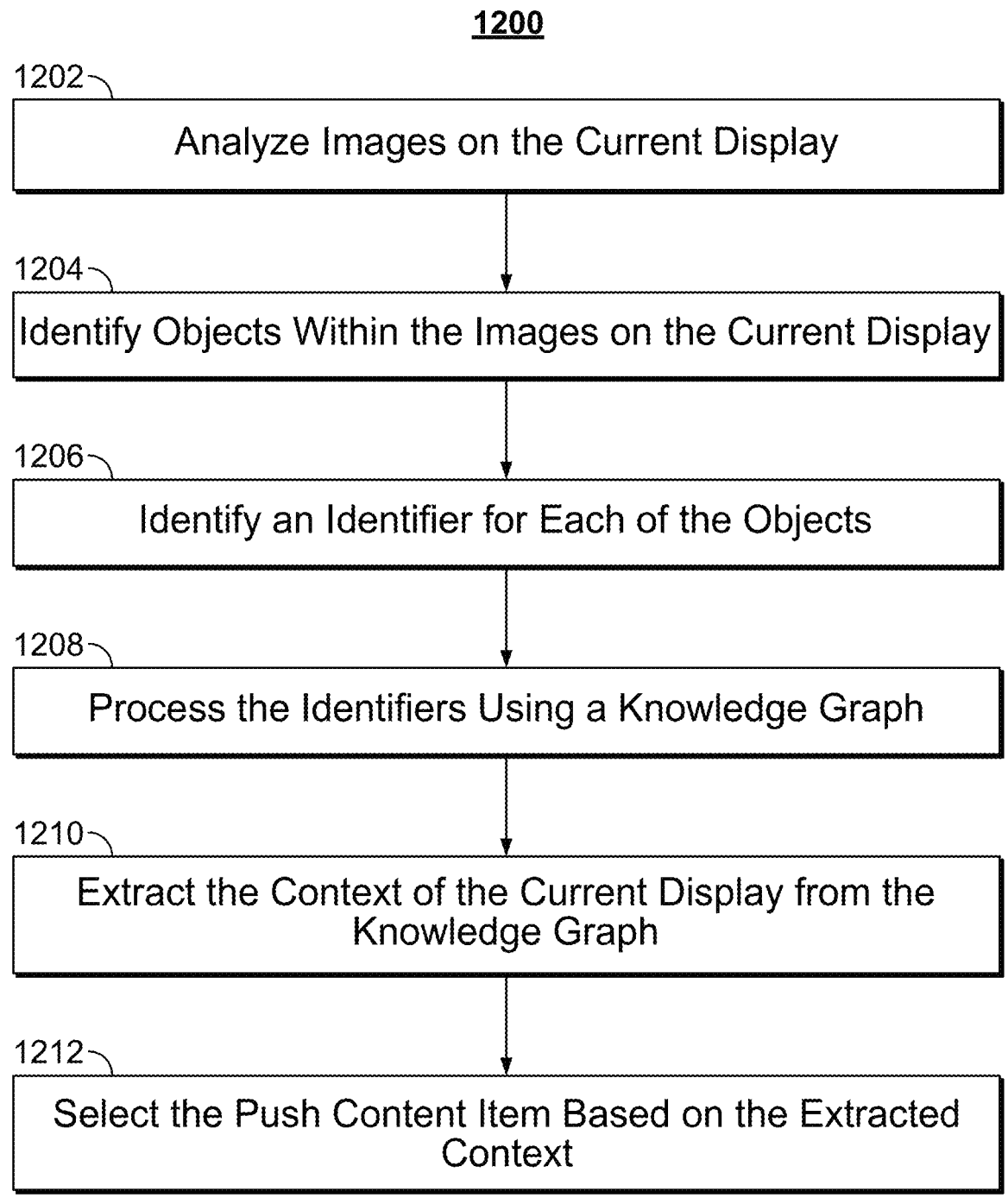
FIG. 12 is a flowchart of an illustrative process for identifying the context of the current output based on images on the current output and a knowledge graph, in accordance with some embodiments of the disclosure.

FIG. 12 shows other embodiments of identifying the context of a current output based on images on the current output. FIG. 12 is a flowchart of an illustrative process 1200 for identifying the context of the current output based on images on the current output and a knowledge graph, in accordance with some embodiments of the disclosure. As shown in FIG. 12, process 1200 processes objects within images on a current output using a knowledge graph. The system then extracts the context of the current output from the knowledge graph and selects the push content item based on the extracted context. In some embodiments, process 1200 can be used to perform steps 710 and 712 of FIG. 7.

At step 1202, the system (e.g., control circuitry 504) analyzes images on the current output. In some embodiments, the system may additionally analyze videos on the current output. The system may perform a number of processes on the image or video, such as image segmentation, image comparisons, and object recognition. In some embodiments, the system may identify portions of the image or video that indicate the relevance of the image to the current output.

At step 1204, the system identifies objects within the images on the current output. In some embodiments, the system may identify objects within the portions of the image of video determined to be meaningful. In some embodiments, the system may identify all objects in the foreground of the image or video. In some embodiments, the system may identify objects in the video that match keywords from textual portions of the current output.

At step 1206, the system identifies an identifier for each of the objects within the images on the current output. For example, the system may identify the names of people who appear in the image or video. Additionally or alternatively, the system may identify any inanimate objects that appear in the image or video. The system may use techniques such as image segmentation, image comparison, and object recognition to identify each of the objects within the image or video.

At step 1208, the system processes the identifiers using a knowledge graph. In some embodiments, the system may identify nodes in a knowledge graph that correspond to the identifiers. The system may then identify nodes connected to the identifiers by edges in the knowledge graph. The system may additionally or alternatively identify nodes that connect the identifier nodes to determine how the identifiers are connected.

At step 1210, the system extracts the context of the current output from the knowledge graph. For example, the system may identify connecting nodes, common nodes with many connections, or relevant periphery nodes in the knowledge graph based on the processing. By analyzing all of the nodes identified by the processing, the system may therefore determine a context of the current output based on the knowledge graph.

At step 1212, the system selects the push content item based on the extracted context. In some embodiments, the system may depict the extracted context based on the nodes identified during the processing. The system may then select push content which comprises metadata which matches, or at least closely conforms to, the identified nodes. In some embodiments, the system may select push content which comprises metadata matching the largest number of nodes identified during the processing. The system may additionally or alternatively select push content which comprises metadata matching peripheral nodes identified during the processing.

It will be understood that process 1200 is merely illustrative and that various modifications can be made in accordance with the present disclosure.

Figure 13:
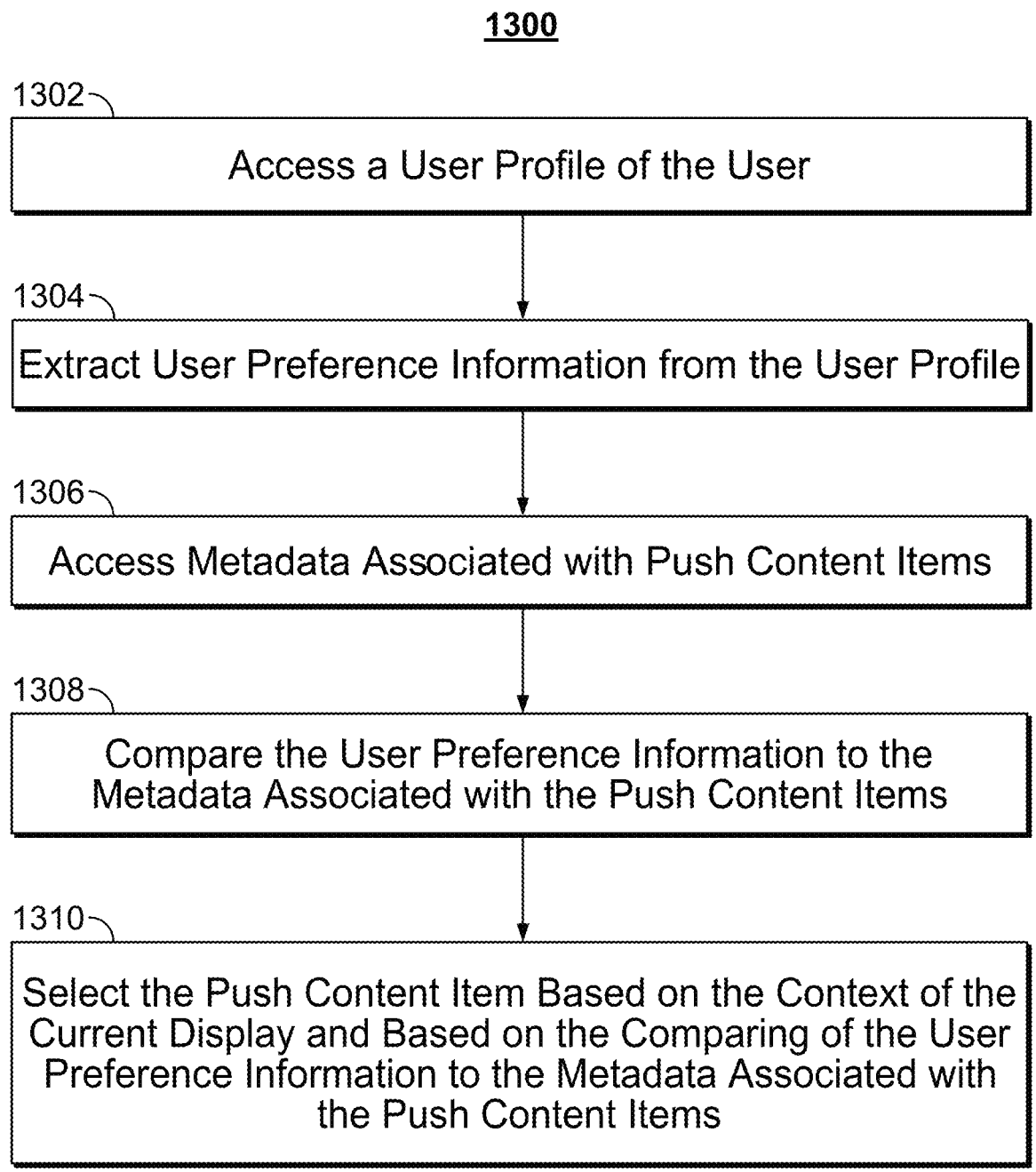
FIG. 13 is a flowchart of an illustrative process for selecting push content based on user preference information, in accordance with some embodiments of the disclosure.

FIG. 13 shows embodiments for adding user preference information as a basis for selecting push content. FIG. 13 is a flowchart of an illustrative process 1300 for selecting push content based on user preference information, in accordance with some embodiments of the disclosure. As shown in FIG. 13, process 1300 compares user preference information from the user profile to metadata associated with the push content items. The system uses this comparison to select push content that is relevant and desirable to the user. In some embodiments, process 1300 can be performed in addition to process 700 of FIG. 7.

At step 1302, the system accesses a user profile of the user. The user profile may be associated with a platform (e.g., social media platform) on a server (e.g., server 606). In some embodiments, the user profile may comprise locally stored information (e.g., in storage 508) about the user. In some embodiments, the user profile may comprise user preference information as a form of user profile information. For example, control circuitry 504 may track user preferences for various push content items and types of push content items. In some embodiments, control circuitry 504 monitors user inputs, such as queries, texts, calls, conversation audio, social media posts, etc., to detect user preferences. The system may further track which push content items and types of push content items users watch fully, skip, exit out of, click on, etc. The system may additionally monitor which push content items lead to purchases by the user. Control circuitry 504 may store this user preference information in the user profile. Additionally, control circuitry 504 may obtain all or part of other user profiles that are related to a particular user (e.g., via social media networks), and/or obtain information about the user from other sources that control circuitry 504 may access.

At step 1304, the system extracts user profile information from the user profile. The system may extract user preference information that is relevant to the push content items, such as user preferences for various push content items and types of push content items. In some embodiments, the system may extract user preference information for products and services toward which the push content items are directed.

At step 1306, the system accesses metadata associated with the push content items. The system may retrieve the push content items from a database (e.g., via server 606). The metadata of the push content items may include keywords, themes, tags, products, brands, target demographics, and related topics.

At step 1308, the system compares the user preference information to the metadata associated with the push content items. The system may compare the user preference information to keywords, themes, tags, products, brands, target demographics, and related topics in the metadata.

At step 1310, the system selects the push content item based on the context of the current output and based on the comparing of the user preference information to the metadata associated with the push content items. In some embodiments, the system may identify push content items whose metadata at least closely matches the user preference information based on keywords, themes, tags, products, brands, or related topics.

It will be understood that process 1300 is merely illustrative and that various modifications can be made in accordance with the present disclosure.

Figure 14:
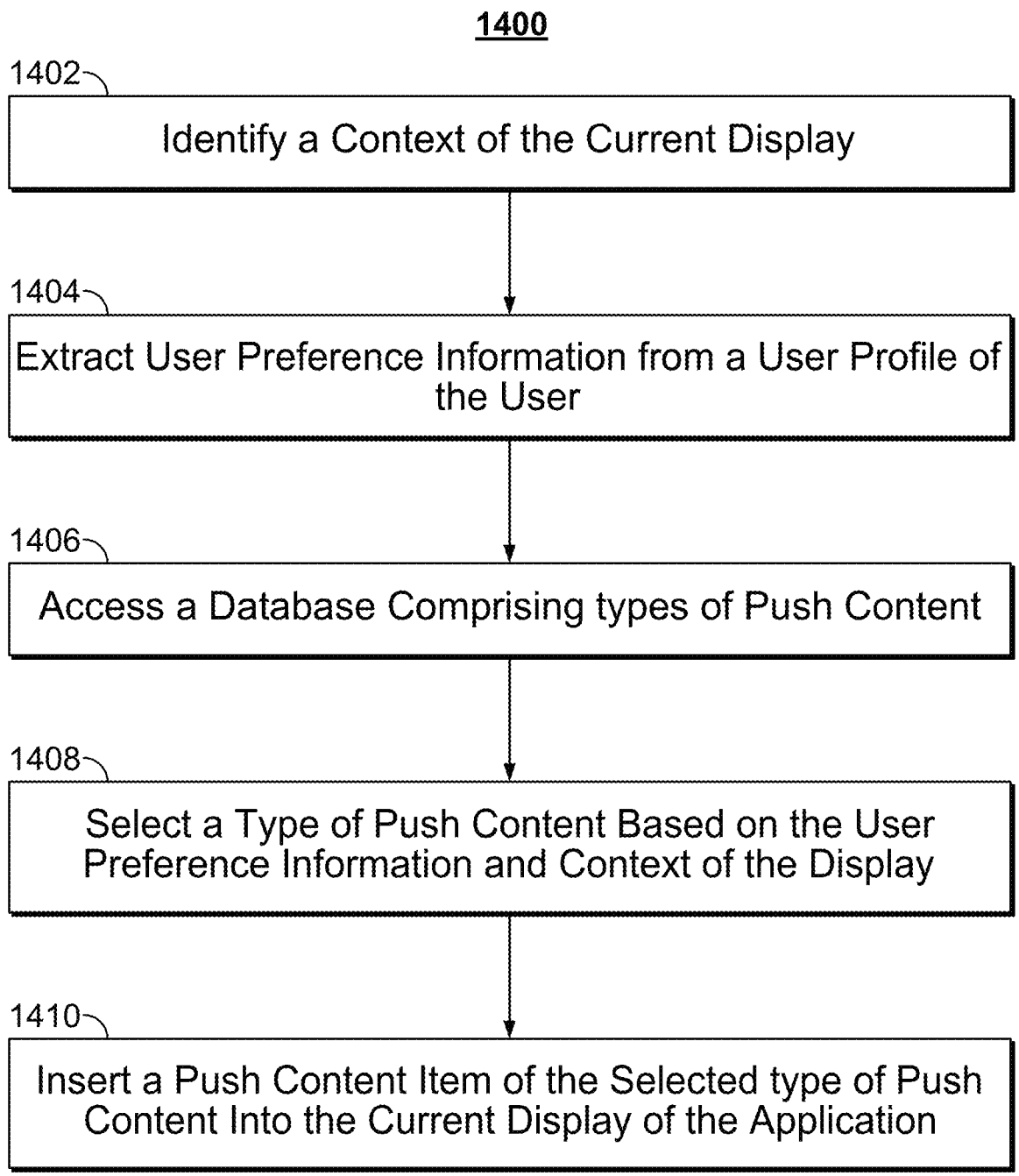
FIG. 14 is a flowchart of an illustrative process for determining a type of push content to output to a user, in accordance with some embodiments of the disclosure.

FIG. 14 shows embodiments for selecting push content of an optimal type of push content items. FIG. 14 is a flowchart of an illustrative process 1400 for determining a type of push content to output to a user, in accordance with some embodiments of the disclosure. As shown in FIG. 14, process 1400 selects a type of push content to output to a user based on user preference information and a context of the user's current output. This process enables the system to present push content toward which the user will be most receptive, thereby maximizing effectiveness of the push content.

At step 1402, the system (e.g., control circuitry 504) identifies a context of the current output. To determine the context, the system may analyze keywords or images of the current output, as discussed in relation to FIGS. 9-12.

At step 1404, the system extracts user preference information from a user profile of a user. The user profile may be associated with a platform (e.g., social media platform) on a server (e.g., server 606). In some embodiments, the user profile may comprise locally stored information (e.g., in storage 508) about the user. In some embodiments, the user profile may comprise user preference information such as user preferences for various push content items and types of push content items. The system may track which push content items and types of push content items the user watches fully, skips, exits out of, clicks on, etc. The system may additionally monitor which push content items lead to purchases by the user. Control circuitry 504 may store this user preference information in the user profile. Additionally, control circuitry 504 may obtain all or part of other user profiles that are related to a particular user (e.g., via social media networks), and/or obtain information about the user from other sources that control circuitry 504 may access. In some embodiments, the system may use voice recognition, facial recognition, fingerprinting, or other techniques to identify a user who is using the device (e.g., device 602). This enables the system to access a user profile for a specific user even if multiple users share the same device.

At step 1406, the system accesses a database (e.g., via server 606) comprising types of push content items. The server may comprise categories of push content items such as notification, audio content item, memes, GIF images, audio players, AR animations, videos, and static graphics. In some embodiments, the push content items may be categorized by the type and, in some embodiments, the push content items may comprise an indication of the type in the metadata.

At step 1408, the system selects a type of push content based on the user preference information and the context of the output. For example, if the system determines that the user typically watches an entire push content item when it is of a certain type, the system may increase a tendency toward that type of push content. For example, the system may determine that the user typically watches AR animation push content items completely and may therefore increase the likelihood of inserting an AR animation push content item. If the system determines that a certain type of push content is likely to result in the user clicking on the push content item and viewing or purchasing a corresponding service or product, the system may increase the tendency toward that type of push content even further. Conversely, if the system determines that the user typically skips or clicks out of push content, the system may decrease a tendency toward that type of push content. For example, if the system identifies that the user typically mutes audio push content items, the system may decrease the likelihood of inserting an audio push content item for that user.

Figure 15:
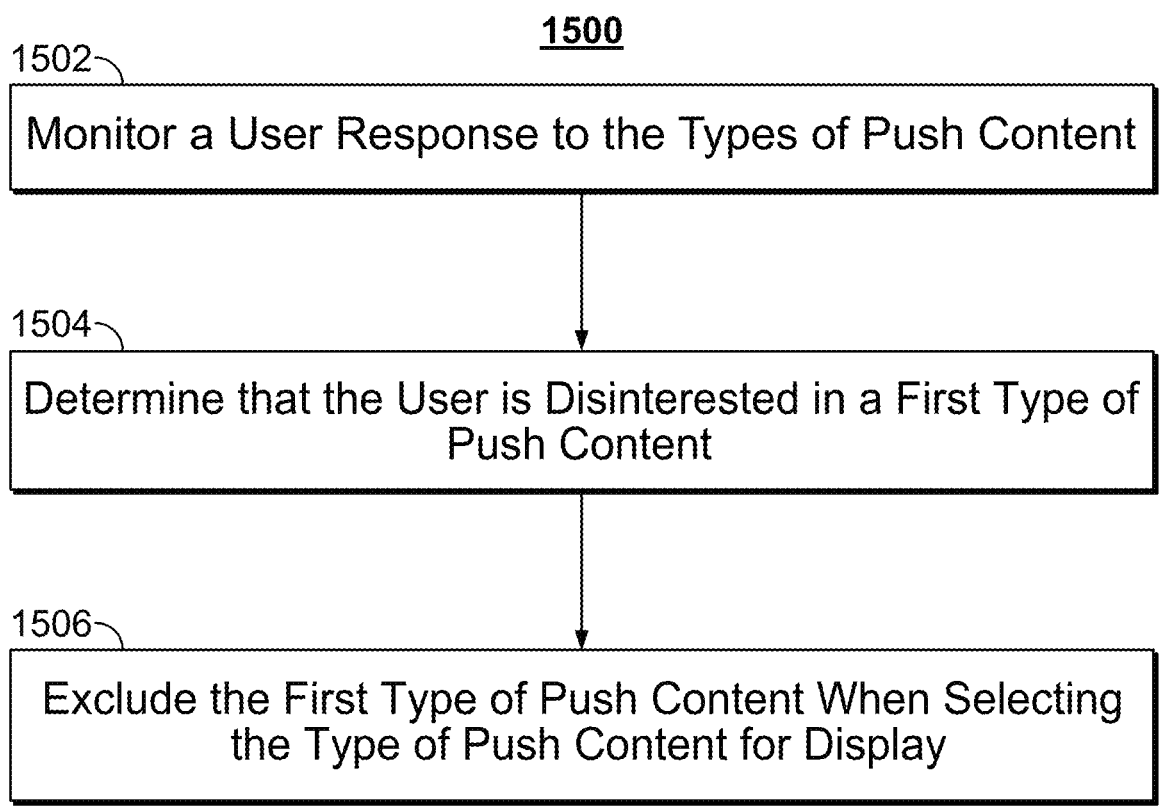
FIG. 15 is a flowchart of an illustrative process for excluding a type of push content based on disinterest of the user, in accordance with some embodiments of the disclosure.
Figure 16:
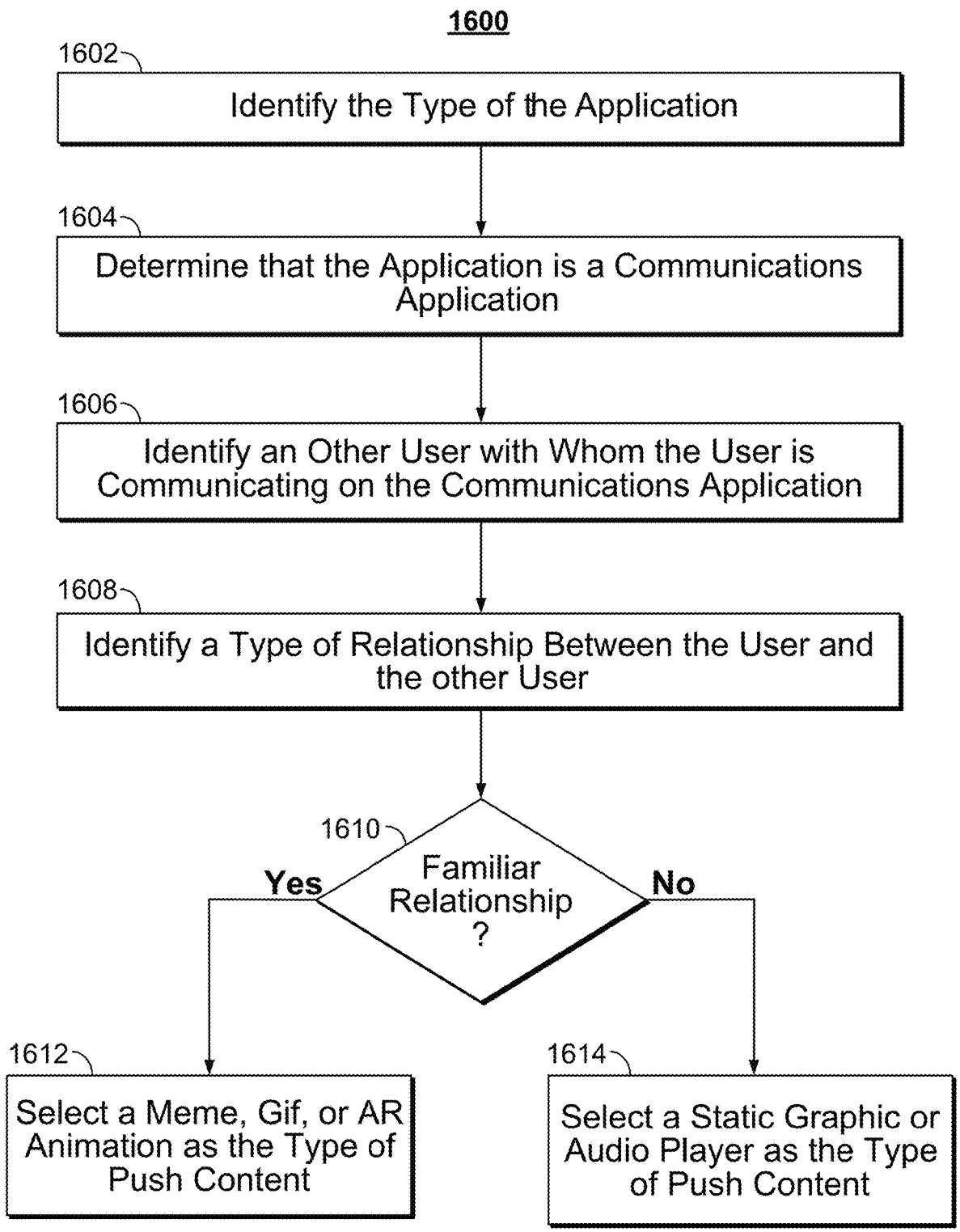
FIG. 16 is a flowchart of an illustrative process for determining a type of push content to output to a user based on a relationship type between the user and an other user communicating in a communications platform, in accordance with some embodiments of the disclosure.

In some embodiments, the selection of a type of push content is further based on the context of the output. For example, some types of push content items may be more appropriate in some situations than in others. The context of the current output may include a type of application, a relationship between the user and any other users with whom the user is communicating on the current output, a tone of the content on the current output, and a level of engagement of the user with the application on the current output. For example, FIG. 3 shows a communications application outputting a text conversation between two users. The conversation is lighthearted and flirtatious, so the system selects a meme push content item for insertion into the current output. The system may perform a number of determinations with respect to the context when selecting a type of push content. FIGS. 15 and 16 describe embodiments for selecting a type of push content based on the context of the current output in greater detail.

At step 1410, the system inserts push content of the selected type into the current output of the application. In some embodiments, the system may choose push content of the selected type based on additional aspects of the current output, such as keyword and image analysis. In some embodiments, the system may insert the push content item into the current output only after determining that the user is passively engaged with the application.

It will be understood that process 1400 is merely illustrative and that various modifications can be made in accordance with the present disclosure.

FIG. 15 shows an embodiment of using the user profile, for example preference, information identified in process 1400 to exclude a type of push content for output. FIG. 15 is a flowchart of an illustrative process 1500 for excluding a type of push content based on disinterest of the user, in accordance with some embodiments of the disclosure. As shown in FIG. 15, process 1500 determines disinterest of the user for a particular type of push content and does not select that type of push content for output. This enables the system to utilize user preference information to effectively target users with appealing push content items. In some embodiments, process 1500 may be performed in addition to process 1400 of FIG. 14.

At step 1502, the system (e.g., control circuitry 504) monitors a user's response to the types of push content items. In some embodiments, the system may monitor the user's engagement with various types of push content items. For example, the system may track which types of push content items the user typically watches in entirety, watches partially, clicks on, closes, skips, or hides. In some embodiments, the system may track a user's responses to push content feedback surveys which ask the user to indicate why the user closed out of push content. In some embodiments, the system may track which types of push content items lead to purchases. The system may store information about the user's response to the types of push content items in local storage (e.g., storage 508).

At step 1504, the system determines that the user is disinterested in a first type of push content. The system may identify disinterest based on monitoring which types of push content items the user typically closes out of, skips, hides, or otherwise ignores. In some embodiments, the system may rank types of push content items for a particular user based on the user's response to the types of push content items. If the system determines that the user is disinterested in the first type based on any of the aforementioned metrics, the system may rank the first type as the lowest type of push content.

At step 1506, the system excludes the first type of push content when selecting the type of push content for output. This ensures that the user is not presented with push content items in a format which is unappealing and thus ineffective for that particular user. The system can instead provide push content items to the user in different formats to which the user is more receptive.

It will be understood that process 1500 is merely illustrative and that various modifications can be made in accordance with the present disclosure.

FIG. 16 shows embodiments for including a type of relationship displayed on a communications application as a basis for selecting a type of push content. FIG. 16 is a flowchart of an illustrative process 1600 for determining a type of push content to output to a user based on a relationship type between the user and an other user communicating via a communications platform, in accordance with some embodiments of the disclosure. As shown in FIG. 16, process 1600 uses the type of relationship between the two users to inform the system as to which types of push content may be appropriate for the situation. By selecting a type of push content based on the type of relationship, the system ensures that the push content item will not be jarring to the user. In some embodiments, process 1600 may be performed in addition to process 1400 of FIG. 14.

At step 1602, the system (e.g., control circuitry 504) identifies the type of the application. The system may identify the type based on branding of the application, descriptions within the application, structure of the application, content within the application, metadata associated with the application, and/or other features of the application. Examples of types of applications include social media, communications, business, storage, streaming, membership, news and weather, gaming, and other applications.

At step 1604, the system determines that the application is a communications application. A communications application may comprise any application which enables the user's device to exchange data with another device. The communications application may feature data exchange functionalities such as messaging, emailing, voice calling, delivery of photographs and videos, posting, and other communications features.

At step 1606, the system identifies an other user with whom the user is communicating on the communications application. The user may be communicating with the other user through messaging, emailing, calling, delivery of photographs and videos, posting, or other communications features.

At step 1608, the system identifies a type of relationship between the user and the other user. In some embodiments, the system may identify a first plurality of user profiles associated with the user across various platforms and a second plurality of user profiles associated with the other user across various platforms. The system may identify relationships between the respective profiles of the user and other user across the platforms. For example, the system may identify that the users are friends on Facebook, do not follow each other on Instagram, are connected on LinkedIn, exchange emails, and do not message each other on messaging applications. In some embodiments, the system may identify keywords, indicators, or tags which indicate a relationship between the two profiles in a platform. For example, the profiles may be identified as belonging to family members in a platform. In some embodiments, a contact name (e.g., such as "Mom") may indicate the relationship between the two users.

At step 1610, the system identifies whether the relationship is a familiar relationship. In some embodiments, the system may identify the relationship as familiar based on the applications through which the two users communicate. For example, messaging, social media, and image and video sharing applications may indicate a familiar relationship, whereas email, professional, and academic applications may not indicate a familiar relationship. In some embodiments, the system may identify certain categories of relationships (e.g., such as friends, family members, classmates, and other relationships) as familiar.

At step 1612, in response to determining that the relationship is familiar, the system selects a meme, GIF, or AR animation as the type of push content. These types of push content may be welcomed in a setting in which a user is communicating with a friend or family member, and the user may even wish to share entertaining or interesting push content items of these types with the other user.

At step 1614, in response to determining that the relationship is not familiar (i.e., the relationship is more formal), the system selects a static graphic or audio player as the type of the push content. These types of push content items may not distract the user from a conversation with the other user and may be unobtrusively integrated into the current output.

It will be understood that process 1600 is merely illustrative and that various modifications can be made in accordance with the present disclosure. For example, in some embodiments, steps 1602 and 1604 can be omitted and the system can start with identifying other users that the user is communicating with.

Figure 17:
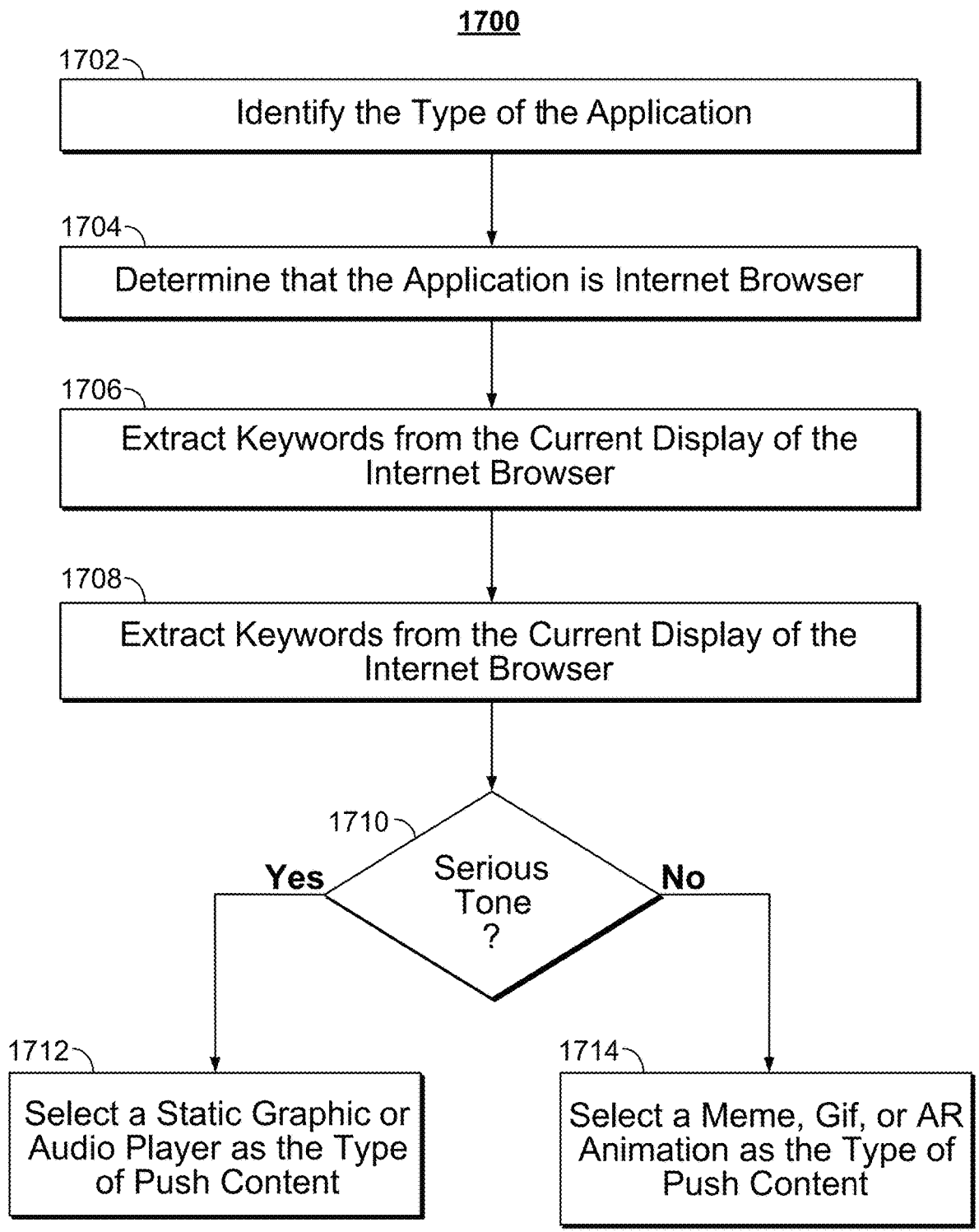
FIG. 17 is a flowchart of an illustrative process for determining a type of push content to output to a user based on a tone of the current output, in accordance with some embodiments of the disclosure.

Whereas FIG. 16 determines type of push content based on the type of relationship between two users who are communicating, in some embodiments, the type of push content can be determined based on the tone of an application that the user is interacting with. FIG. 17 is a flowchart of an illustrative process 1700 for determining a type of push content to output to a user based on a tone of the current output, in accordance with some embodiments of the disclosure. As shown in FIG. 17, process 1700 uses the tone of the current output to inform the system as to which types of push content may be appropriate for the situation. By selecting a type of push content based on the tone of the current output, the system ensures that the push content will align with the content of the current output. In some embodiments, process 1700 may be performed in addition to process 1400 of FIG. 14.

At step 1702, the system (e.g., control circuitry 504) identifies the type of the application. The system may identify the type based on branding of the application, descriptions within the application, structure of the application, content within the application, metadata associated with the application, and/or other features of the application. Examples of types of applications include social media, communications, business, storage, streaming, membership, news and weather, gaming, and other applications.

At step 1704, the system determines that the application is an internet browser. The system may be any application which enables the user to explore the internet. The internet browser application may present news stories, images and videos, links to other content, websites, and various other content. In some embodiments, the user may access the internet browser through links in other applications such as social media applications or messaging applications.

At step 1706, the system extracts keywords from the current output of the internet browser. In some embodiments, the system may extract images, metadata, or other information from the current output of the internet browser. Additionally or alternatively, the system may access keywords and images from applications and web pages which link to the current output of the internet browser. For example, the user may access keywords and images from social media postings which link to the current webpage.

At step 1708, the system determines a tone of the current output of the internet browser based on the keywords. In some embodiments, this determination may also be based upon images in the current output or metadata associated with the webpage in the current output. The system may identify certain keywords or images with a serious tone while other keywords or images may be associated with a lighthearted tone. In some embodiments, the system additionally analyzes the type of application in order to determine the tone.

At step 1710, the system determines whether the current output has a serious tone. For example, if keywords such as "statement," "balance," and "pay" appear on the current output, the system may identify the type of webpage as "online banking" and the tone as serious. In another example, keywords such as "quiz," "share," and "friends" may appear on the current output. The system may therefore determine that the type of webpage is "social" and that the tone is lighthearted.

At step 1712, in response to determining that the tone is serious, the system selects a static graphic or audio player as the type of push content. These types of push content items may not distract the user from the serious content on the current output and may be unobtrusively integrated into the current output.

At step 1714, in response to determining that the tone is not serious, the system selects a meme, GIF, or AR animation as the type of push content. These types of push content may be welcomed in a lighthearted setting and may add to the content that the user can enjoy on the current output.

It will be understood that process 1700 is merely illustrative and that various modifications can be made in accordance with the present disclosure.

Figure 18:
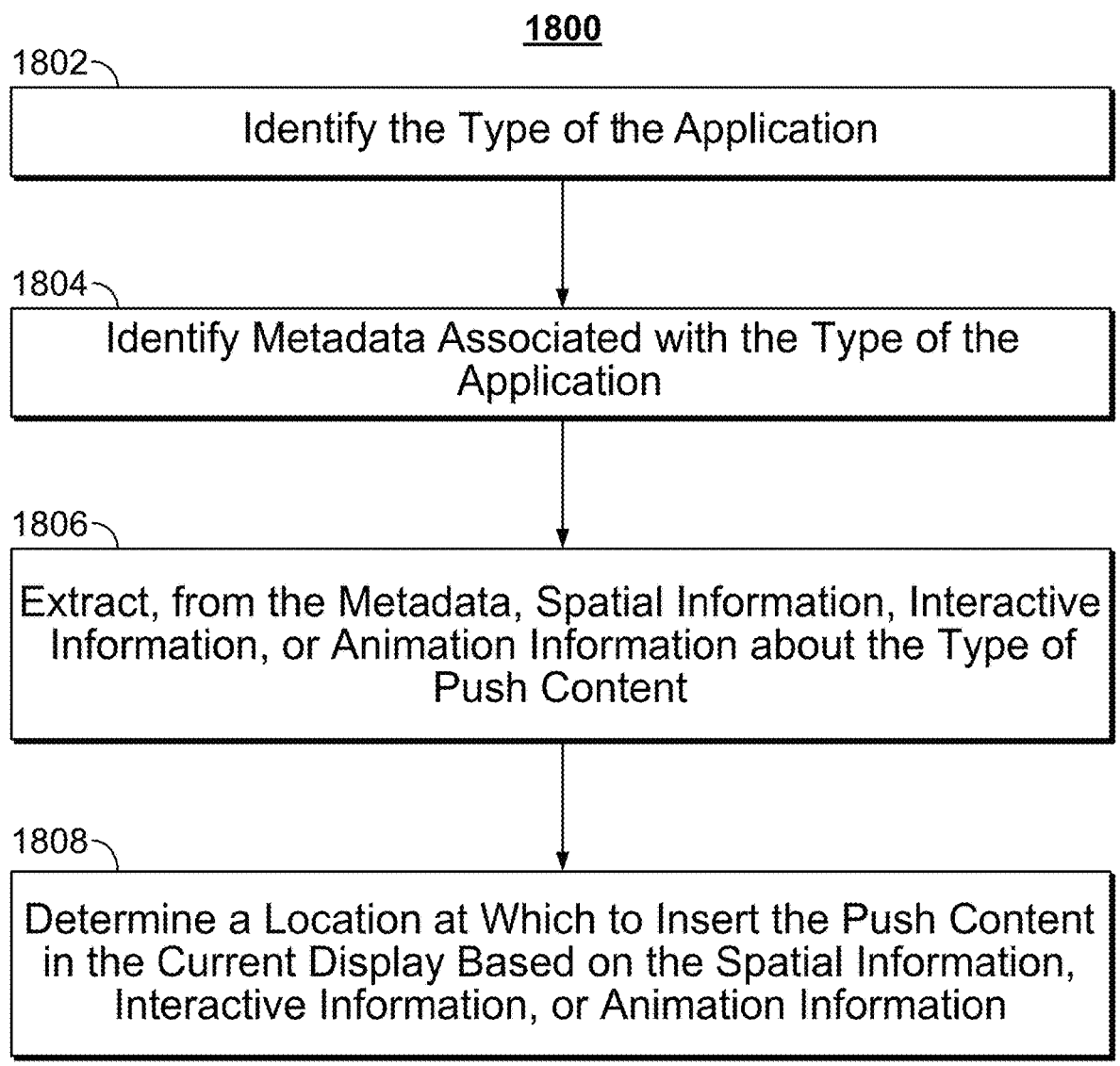
FIG. 18 is a flowchart of an illustrative process for determining a location at which to insert push content to output to a user based on spatial, interactive, or animation information associated with the type of push content, in accordance with some embodiments of the disclosure.

Once the type of push content is selected, the placement of the push content item on the current output can be determined based on the type of push content. FIG. 18 is a flowchart of an illustrative process 1800 for determining a location at which to insert push content to output to a user based on spatial, interactive, or animation information associated with the type of push content, in accordance with some embodiments of the disclosure. As shown in FIG. 18, process 1800 uses spatial, interactive, or animation information of the type of push content in order to determine a location at which to insert the push content item into the current output. This allows for optimal placement and seamless integration into the current output, which improves the push content experience for the viewer. In some embodiments, process 1800 may be performed in addition to process 1400 of FIG. 14.

At step 1802, the system (e.g., control circuitry 504) identifies the type of the application. The system may optionally identify the type based on branding of the application, descriptions within the application, structure of the application, content within the application, metadata associated with the application, and/or other features of the application. Examples of types of applications include social media, communications, business, storage, streaming, membership, news and weather, gaming, and other applications.

At step 1804, the system identifies metadata associated with the type of the application. Metadata associated with the type of the application may include descriptive information, tags, classifications, or other information.

At step 1806, the system extracts spatial, interactive, or animation information about the type of the push content from the metadata. The spatial, interactive, or animation information may be extracted from characteristics of the type of application or any other information used in step 1802. In some embodiments, spatial information may include a shape of a type of push content (e.g., notifications, memes, and GIFs are typically rectangular). In some embodiments, the metadata may specify a minimum size of the type of push content (e.g., if there is text in the push content item that must be large enough to read). In some embodiments, the size restrictions specify a maximum size of the type of push content (e.g., if the push content type typically has a low resolution). In some embodiments, the spatial information may include placement information, such as how close the push content item should be placed to related keywords. In some embodiments, the spatial information may include information on whether the push content item is embedded in the current output or whether it hovers above the current output. In some embodiments, the spatial information may include information on whether the push content item should be placed within the output of the application or whether the push content item should be presented as a side bar or pop-up notification.

In some embodiments, interactive information may include information on how the push content item interacts with the objects on the screen. For example, the push content item may appear to knock over letters on the current output or hide behind an image. In some embodiments, interactive information may also include information on how the user interacts with the push content item. For example, the push content item may change appearance when the user hovers over the push content item with a computer mouse or by gesturing on a touchscreen interface.

In some embodiments, animation information may comprise preprogrammed motion of the push content item across the screen. In some embodiments, the animation information may be scaled with the size of the push content item. In some embodiments, the animation information may be scaled separately from the size of the push content item. In some embodiments, the animation information may be related to the interactive information.

At step 1808, the system determines a location at which to insert the push content item in the current output based on the spatial, interactive, or animation information. For example, the spatial information may indicate that the push content item should be placed in a region of a certain shape and size. The system may identify a region which complies with these specifications and may select that region as the location for the push content item. In another example, the system may identify interactive and animation information that specifies that push content must be inserted next to an image or above a piece of text. The animation information may, additionally or alternatively, specify that the push content item will move over a certain range of the output and must therefore be placed with enough space to move. The spatial, interactive, and animation information may specify a location based on a number of other factors.

It will be understood that process 1800 is merely illustrative and that various modifications can be made in accordance with the present disclosure.

FIG. 19 describes the insertion of an animated push content item into an output such that the animated push content item interacts with the user's output. FIG. 19 is a flowchart of an illustrative process 1900 for inserting a dynamic push content item into content, in accordance with some embodiments of the disclosure. As shown in FIG. 19, process 1900 inserts an animated push content item into a current output and causes at least one interaction between an animated graphic element of the animated push content item and an object on the current output. The insertion of an animated push content item into an output in a way that interacts with the current output creates a visually interesting and appealing push content experience that is more likely to cause user engagement with the push content.

At step 1902, the system identifies an object on a current output of an application. The object may include text, an image, a video, or another object. In some embodiments, the system may identify only objects in the foreground, thereby excluding background images or text. In some embodiments, the system may identify an object that is semantically important to the current output, such as a word, image, or video that relates to a topic of the current output.

At step 1904, the system accesses a database of animated push content items (e.g., server 606). The database may comprise animated push content items containing animated graphic elements, preprogrammed motion, preprogrammed interactions, and other animated features. The animated push content items may comprise metadata which includes information about the animated features of each animated push content item.

At step 1906, the system selects an animated push content item having an animated graphic element from the database. In some embodiments, the system may select a desired animated push content item or an animated push content item having a desired animated graphic element. For example, the system may select a type of animated push content that the user has shown a tendency to positively engaged with (e.g., a particular character, a type of animated push content, a specific brand, etc.). In some embodiments, the system may select an animated push content item which matches the context of the current output (e.g., a topic, tone, reference, or other aspect of the current output). In some embodiments, the system may select an animated push content item whose animated graphic element is compatible with the current output. For example, the animated graphic element may specify that an animated push content item must hide behind an image on the current output. Therefore, the system may select that animated push content item if the current output contains an image. In another example, the animated graphic element may specify that the animated push content item requires a certain sized and shaped region on the current output. Therefore, the system may only select that animated push content item if the current output contains a compatible region.

At step 1908, the system inserts the animated push content item at an insertion point in the current output. In some embodiments, the system may select the insertion point based on the specifications of the animated graphic element. In some embodiments, the system may select the insertion point based on the metadata associated with the animated push content item. Methods of selecting an insertion point will be discussed in greater detail, for example, in relation to FIG. 20.

At step 1910, the system moves the animated graphic element on the current output. In some embodiments, the animated graphic element may be preprogrammed in the animated push content item. In some embodiments, the animated graphic element may move according to spatial information and animated information stored in the metadata of the animated push content item. In some embodiments, the animated graphic element may move based on available space on the current output and the locations of objects on the current output. In some embodiments, the animated graphic element may move according to input from the user. In this example, the animated graphic element may react to input from the user (e.g., via input interface 510) and may move accordingly).

At step 1912, the system causes at least one interaction of the animated graphic element with the object on the current output. The interaction may be preprogrammed into the animated graphic element of the animated push content item. For example, the animated push content item may be preprogrammed to move in a certain direction, encounter an object, and subsequently interact with that object. The system may therefore place the animated push content item accordingly so that the animated push content item is able to interact with an appropriate object. In some embodiments, the animated push content item may interact with an object that the user recently viewed, created, or clicked on. Therefore, the animated push content item may be placed in such a way that it is able to interact with one of these specific objects. The animated graphic element may cause a number of different interactions. For example, as shown in FIG. 4, the animated push content item (e.g., character 410) may cause an object (e.g., name 402) to topple over. In another example, the animated push content item (e.g., character 412) may cause an object (e.g., text bubble 406) to change appearance. In another example, the animated push content item (e.g., character 414) may cause an objects (e.g., text bubble 408) to move. Other interactions may include hiding behind an object, changing the color of an object, changing the size of an object, turning an object into a 3D rendering of the object, or any other modification.

It will be understood that process 1900 is merely illustrative and that various modifications can be made in accordance with the present disclosure.

Figure 20:
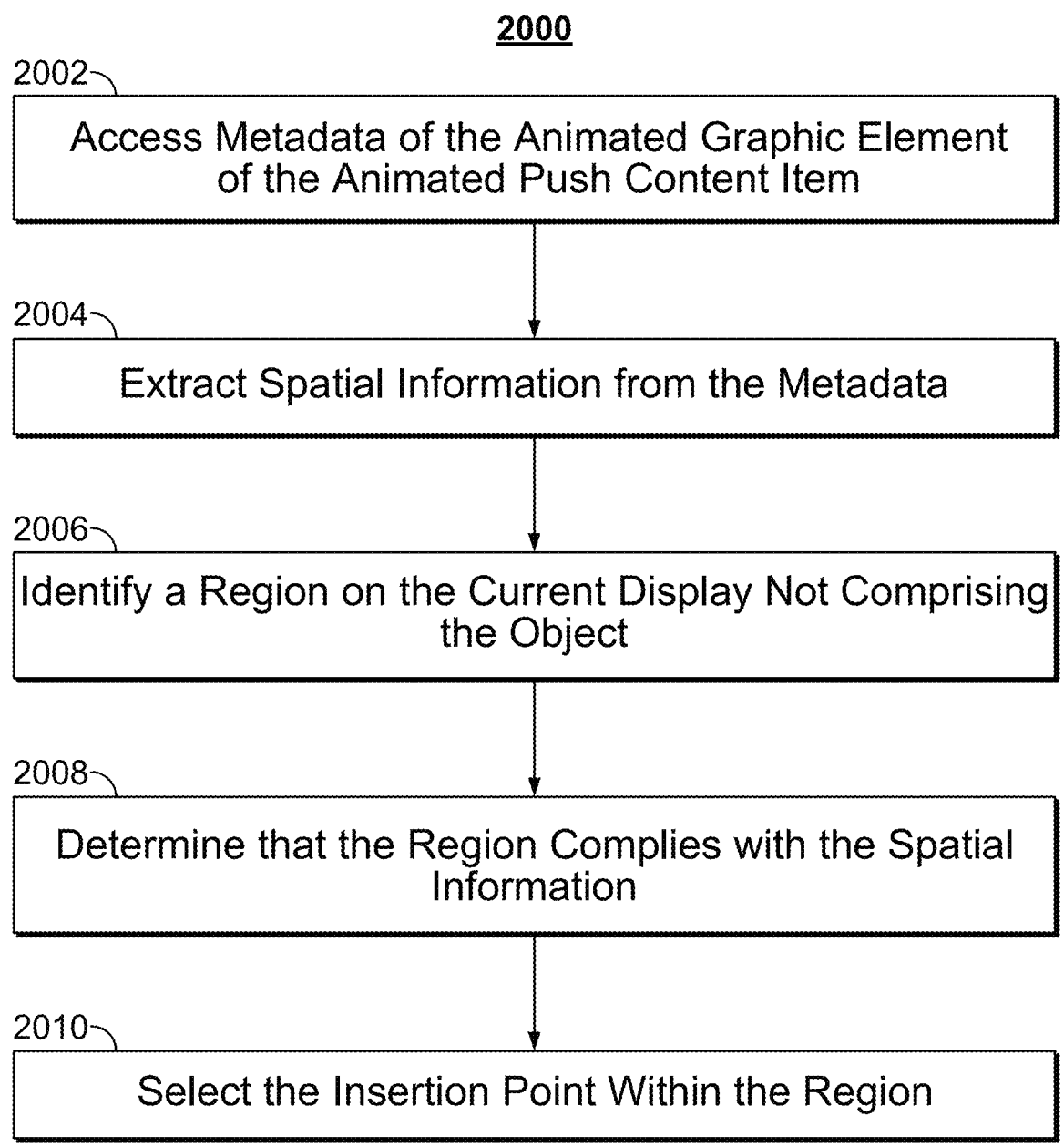
FIG. 20 is a flowchart of an illustrative process for identifying an insertion point for a push content item, in accordance with some embodiments of the disclosure.

FIG. 20 shows an embodiment for using spatial information to select an insertion point for push content. FIG. 20 is a flowchart of an illustrative process 2000 for identifying an insertion point for a push content item, in accordance with some embodiments of the disclosure.

As shown in FIG. 20, process 2000 extracts spatial information from the metadata of the animated push content item, identifies a region that complies with the spatial information of the animated push content item, and selects an insertion point for the animated push content item within the region. This ensures that the animated push content item will fit appropriately in the current output. In some embodiments, process 2000 is used to select the insertion point in step 1908 of FIG. 19.

At step 2002, the system (e.g., control circuitry 504) accesses metadata of the animated graphic element of the animated push content item. The metadata of the animated push content item may comprise spatial information, animated information, and/or interactive information.

At step 2004, the system extracts spatial information from the metadata. In some embodiments, spatial information may include a shape of a type of push content (e.g., notifications, memes, and GIFs are typically rectangular). In some embodiments, the metadata may specify a minimum size of the type of push content (e.g., if there is text in the push content item that must be large enough to read). In some embodiments, the size restrictions specify a maximum size of the type of push content (e.g., if the push content item type typically has a low resolution). In some embodiments, the spatial information may include placement information, such as how close the push content item should be placed to related keywords. In some embodiments, the spatial information may include information on whether the push content item is embedded in the current output or whether it hovers above the current output. In some embodiments, the spatial information may include information on whether the push content item should be placed within the output of the application or whether the push content item should be presented as a sidebar or pop-up notification.

At step 2006, the system identifies a region on the current output not comprising the object. In some embodiments, the system may identify a region not containing any objects in the foreground. The region may be a space between objects on the current output, a part of the screen not currently being used, or a part of the screen having only a background image or color.

At step 2008, the system determines that the region complies with the spatial information of the animated push content item. For example, the region may be an appropriate shape and size and may be able to support the addition of an animated push content item into the current output.

At step 2010, the system selects the insertion point within the region. In some embodiments, the system may select an insertion point according to the animated graphic element. In some embodiments, the system may select an insertion point according to the objects on the current output. For example, if an animated push content item must move across the output, the system may select an insertion point such that the animated push content item can complete this motion. For example, if an animated push content item must hide behind a word, the system may select an insertion point such that the animated push content item can move behind a nearby word on the current output.

It will be understood that process 2000 is merely illustrative and that various modifications can be made in accordance with the present disclosure.

FIG. 21 shows a method of aligning an animated push content item with the output to cause the interaction described by FIG. 19. FIG. 21 is a flowchart of an illustrative process 2100 for inserting a push content item into a current output by matching spatial points of the push content item with display points of the current output, in accordance with some embodiments of the disclosure. As shown in FIG. 21, process 2100 aligns key points of the motion of the animated graphic element with display points on the current output. This allows the animated push content item to be fully integrated into the current output. In some embodiments, process 2100 can be used to perform step 1912 of FIG. 19.

At step 2102, the system accesses metadata of the animated graphic element of the animated push content item. The metadata of the animated push content item may comprise spatial information, animated information, and/or interactive information.

At step 2104, the system extracts spatial information of the animated graphic element from the metadata. In some embodiments, spatial information may include a shape of a region required by the animated graphic element. In some embodiments, the metadata may specify a minimum size of a region in which to display the animated graphic element. In some embodiments, the metadata may specify a maximum size of a region in which to display the animated graphic element. In some embodiments, the spatial information may include placement information, such as how close the animated push content item should be placed to related keywords. In some embodiments, the spatial information may include information on whether the animated push content item is embedded in the current output or whether it is arranged to appear to hover above the current output. In some embodiments, the spatial information may include information on whether the animated push content item should be placed within the display of the application or whether the push content item should be presented in a side bar or pop-up notification. In some embodiments, the spatial information may comprise a type of object with which the animated push content item can interact. In some embodiments, the spatial information of the animated push content item may include spatial points of the animated graphic element. For example, spatial points may include starting and ending points of motion of the animated graphic element, a point at which the animated push content item interacts with an object, a point to which the animated push content item moves after an interaction with an object, or any other points that dictate the motion of the animated push content item.

At step 2106, the system aligns spatial points from the spatial information with one or more display points on the current output. In some embodiments, the display points may be points on the current output that correspond to objects, edges, corners, or other visual features of the current output. In some embodiments, the system may align the spatial points with as many display points as possible. For example, if the animated push content item moves in a path that changes direction three times, the system may attempt to locate three display points with which to align the spatial points.

At step 2108, the system extracts interactive information of the animated graphic element from the metadata. In some embodiments, interactive information may include information on how the push content item interacts with the objects on the screen. For example, the push content item may knock over letters on the current output or hide behind an image. In some embodiments, interactive information may also include information on how the user interacts with the push content item. For example, the push content item may change appearance when the user hovers over the push content item with a computer mouse or by gesturing on a touchscreen interface.

At step 2110, the system identifies a spatial point that corresponds to at least one interaction based on the interactive information. For example, one or more of the spatial points may correspond to a point at which the animated graphic element interacts with an object on the current output. For example, such a point may be a point at which an animated push content item moves behind an image, knocks into a word, or bounces off an object.

At step 2112, the system identifies a display point that corresponds to the spatial point. Since the system has already aligned the spatial points with the display points, the system may simply identify the display point which corresponds to the spatial point at which an interaction occurs.

At step 2114, the system modifies the object at the display point according to the at least one interaction. The animated push content item may comprise metadata which specifies the way in which the object and/or animated push content item are modified by the interaction. In some embodiments, the interaction may cause the object at the display point to change. For example, the object may change in appearance, change color, move, become 3D, disappear, grow smaller or larger, or change in any other way. In some embodiments, the interaction may, additionally or alternatively, cause the animated push content item to change. For example, the animated push content item may change in appearance, change color, move, become 3D, disappear, grow smaller or larger, or change in any other way.

It will be understood that process 2100 is merely illustrative and that various modifications can be made in accordance with the present disclosure.

Figure 22:
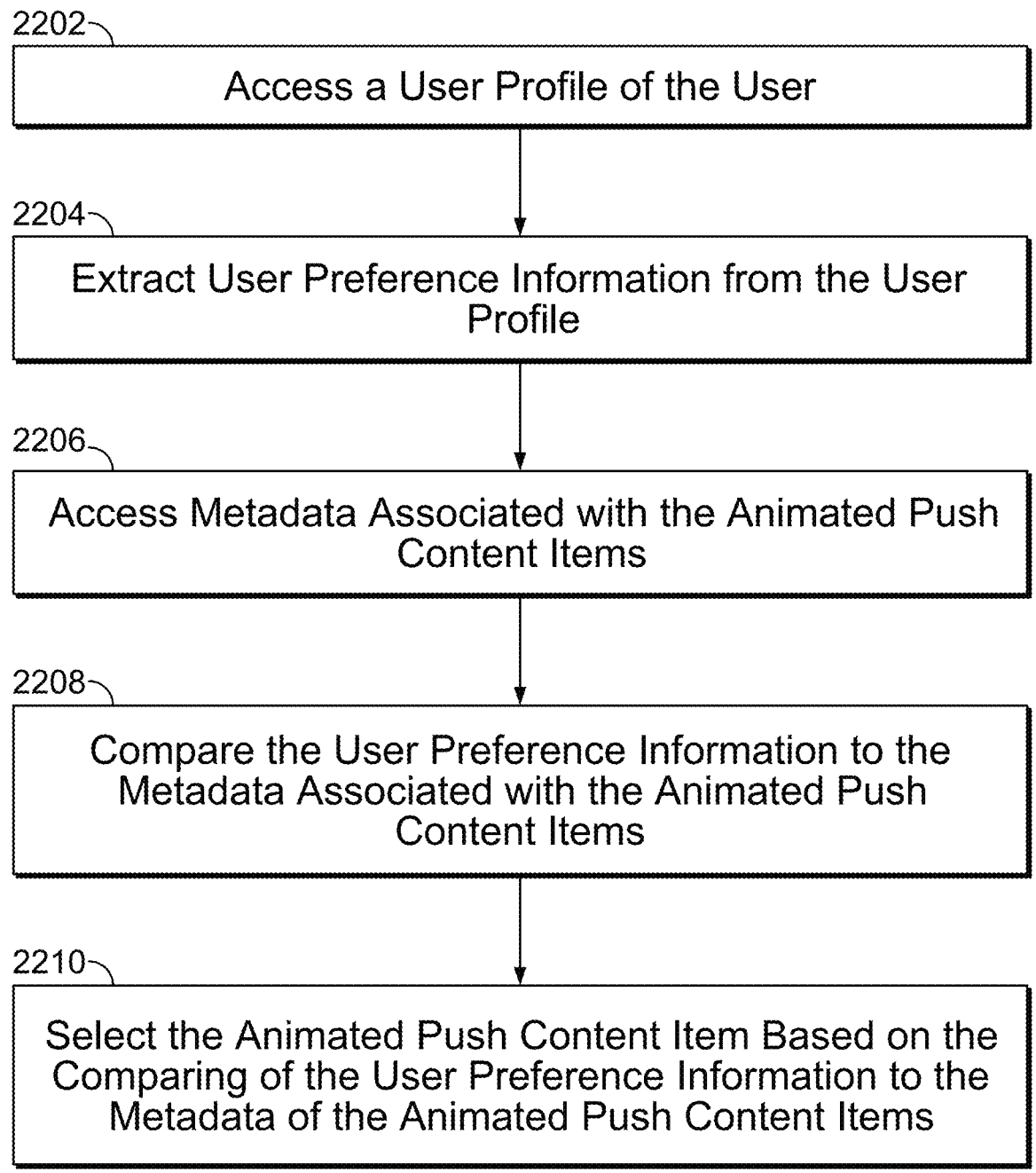
FIG. 22 is a flowchart of an illustrative process for selecting a push content item for output based on user preference information, in accordance with some embodiments of the disclosure.

FIG. 22 shows an embodiment in which user preference information is included as a basis for selecting an animated push content item. FIG. 22 is a flowchart of an illustrative process 2200 for selecting a push content item for output based on user profile information, for example preference information, in accordance with some embodiments of the disclosure. As shown in FIG. 22, process 2200 extracts user preference information from a user profile of the user and compares the user preference information to metadata of the animated push content items in order to select the animated push content item. This enables the system to customize the push content item experience for the user. In some embodiments, process 2200 may be performed in addition to process 2100 of FIG. 21.

At step 2202, the system accesses a user profile of the user. The user profile may be associated with a platform (e.g., social media platform) on a server (e.g., server 606). In some embodiments, the user profile may comprise locally stored information (e.g., in storage 508) about the user. In some embodiments, the user profile may comprise user preference information.

For example, control circuitry 504 may track user preferences for various animated push content items and types of animated push content items. In some embodiments, control circuitry 504 monitors user inputs, such as queries, texts, calls, conversation audio, social media posts, etc., to detect user preferences. The system may further track which animated push content items and types of animated push content items users watch fully, skip, exit out of, click on, etc. The system may additionally monitor which animated push content items lead to purchases by the user. Control circuitry 504 may store this user preference information in the user profile. Additionally, control circuitry 504 may obtain all or part of other user profiles that are related to a particular user (e.g., via social media networks), and/or obtain information about the user from other sources that control circuitry 504 may access.

At step 2204, the system extracts user preference information from the user profile. The system may extract only user preference information that is relevant to the animated push content items, such as user preferences for various animated push content items and types of animated push content items. In some embodiments, the system may extract user preference information for products and services toward which the animated push content items are directed.

At step 2206, the system accesses metadata associated with the animated push content items. The metadata of the animated push content items may include keywords, themes, tags, products, brands, target demographics, and related topics.

At step 2208, the system compares the user preference information with the metadata associated with the animated push content items. The system may compare the user preference information with keywords, themes, tags, products, brands, target demographics, and related topics in the metadata.

At step 2210, the system selects the animated push content item based on the comparing of the user preference information to the metadata of the animated push content items. In some embodiments, the system may select an animated push content item whose metadata matches the user preference information based on keywords, themes, tags, products, brands, or related topics.

It will be understood that process 2200 is merely illustrative and that various modifications can be made in accordance with the present disclosure.

It will be understood that the above-described embodiments can be implemented using pre-processing methods or post-processing display techniques. For example, in some embodiments, the system which implements the above-described processes may be a part of the application that the user is interacting with. In this case, the embodiments described herein may be performed as pre-processing display techniques. If the above-described processes are to be performed as pre-processing display techniques, then the processes may differ from the above descriptions. For example, certain steps may be omitted or obsolete if the system which implements the above-described processes is a part of the application that the user is interacting with. In some embodiments, certain steps (e.g., identifying the type of the application) may be skipped due to the fact that the system and the application are one and the same.

If, however, the system which implements the above-described processes is a standalone push content item insertion application or is a part of the operating system of the device, then the embodiments described herein may be performed as post-processing display techniques. If the above-described embodiments are to be performed as post-processing techniques, then the processes may be performed as outlined in the above descriptions.

In some embodiments, pre-processing display techniques for inserting push content items may include loading and modifying data (e.g., html data) which provides instructions for the control circuitry 504 to generate the push content item for display. In some embodiments, certain data (e.g., logic) may dictate how the system (e.g., control circuitry 504) modifies the display to include the push content item. In some embodiments, the pre-processing display techniques may include analyzing the underlying data used to generate the display.

In some embodiments, post-processing display techniques for inserting push content items may include superimposing push content onto the current output of an application. For example, the system may send additional data to the control circuitry 504 containing instructions to replace a portion of the display with a display of the push content item. In some embodiments, the post-processing display techniques for determining the current output of an application may include analyzing the current output that is being output on the device.

In some embodiments, pre-processing display techniques for causing interactions between animated push content items and objects on a current output of an application may include altering the data (e.g., html data) which contains the instructions for the control circuitry 504 to generate the push content item for display. For example, the system may identify that the animated push content item comprises instructions to interact with an object at a certain point on the display. The system may identify the corresponding object and alter the data controlling the display of the object in order to move, alter, or otherwise change the display of the object.

In some embodiments, post-processing display techniques for causing interactions between animated push content items and objects on a current output of an application may include identifying and capturing an object on the current output with which the animated push content item will interact. The system may then move the object to another part of the display. For example, the system may identify that the animated push content item comprises instructions to interact with an object at a certain point on the display. The system may then identify the object and capture the object such that the system may replicate the display of the object. The system may then move, alter, or otherwise change the display of the object. If the system has moved the object, the system may then fill in the portion of the display where the object previously resided with a background image or color, the animated push content item, or a combination thereof.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of presenting push content on a device to a user, the method comprising:
    detecting that a device is providing an output from an application running on the device, wherein the output comprises first displayed content;
    monitoring a level of engagement of the user with the application;
    receiving a scroll command to navigate to second displayed content from the first displayed content, wherein at least a portion of the second displayed content is not included in the first displayed content;
    in response to receiving the scroll command, navigating to the second displayed content and determining that the level of engagement is above a predetermined activity level;
    determining an elapsed time since the scroll command was received;
    determining that the elapsed time since the scroll command was received exceeds a predetermined period of time;
    determining that no additional scroll commands have been received during the elapsed time;
    in response to determining, while the application on the device is opened, that the elapsed time since the scroll command was received exceeds the predetermined period of time and that no additional scroll commands have been received during the elapsed time, determining that the level of engagement is below the predetermined activity level;

determining that push content should be inserted into the second displayed content having been navigated to in response to receiving the scroll command;
identifying a context of the second displayed content of the application by:
identifying a first object and a second object depicted by the second displayed content;
determining that the first object is depicted more prominently than the second object; and
in response to determining that the first object is depicted more prominently than the second object, determining that the context of the second displayed content relates to the first object;
selecting a push content item based at least on the context of the second displayed content; and
in response to determining that the level of engagement is below the predetermined activity level, causing the push content item to be inserted into the second displayed content.

2. The method of claim 1, wherein determining that the push content should be inserted into the second displayed content comprises:
identifying one or more objects included in the second displayed content;
identifying a region in the second displayed content which does not include the one or more objects; and
determining a size of the region.

3. The method of claim 2, further comprising:
comparing the size of the region with a plurality of dimensional requirements for one or more push content items;
determining that the one or more push content items fit within at least one dimensional requirement for at least one push content item; and
determining to insert the push content into the region.

4. The method of claim 1, wherein identifying the context of the second displayed content comprises extracting one or more keywords from the second displayed content,
wherein selecting the push content item based on the context of the second displayed content comprises:
accessing metadata associated with a plurality of push content items;
comparing the one or more keywords from the second displayed content of the application to the metadata associated with the plurality of push content items; and
selecting the push content item from the plurality of push content items whose metadata conforms to the one or more keywords from the second displayed content.

5. The method of claim 1, wherein identifying the context of the second displayed content of the application further comprises:
extracting one or more keywords from the second displayed content of the application;
processing the one or more keywords using a knowledge graph; and
extracting the context of the second displayed content from the knowledge graph,
wherein selecting the push content item based on the context of the second displayed content comprises selecting the push content item based on the extracted context.

6. The method of claim 1, wherein identifying the context of the second displayed content of the application further comprises:
analyzing one or more images included in the second displayed content of the application;
identifying one or more objects within the one or more images; and
identifying an identifier for each of the one or more objects,
wherein selecting the push content item based on the context of the second displayed content comprises:
accessing metadata associated with a plurality of push content items; and
comparing the identifier for each of the one or more objects with the metadata associated with the plurality of push content items; and
selecting the push content item from the plurality of push content items whose metadata conforms to the identifier for one or more of the objects on the second displayed content.

7. The method of claim 1, wherein identifying the context of the second displayed content of the application further comprises:
analyzing one or more images on the second displayed content of the application;
identifying one or more objects within the one or more images;
identifying an identifier for each of the one or more objects;
processing the identifier for each of the one or more objects using a knowledge graph; and
extracting the context of the second displayed content from the knowledge graph,
wherein selecting the push content item based on the context of the second displayed content comprises selecting the push content item based on the extracted context.

8. The method of claim 1, further comprising:
accessing a user profile of the user;
extracting user information from the user profile; and
basing selection of the push content item based on the extracted user information.

9. The method of claim 8, further comprising:
accessing metadata associated with a plurality of push content items; and
comparing the user information with the metadata associated with the plurality of push content items,
wherein selecting the push content item based on the context of the second displayed content is further based on the comparing of the user information with the metadata associated with the plurality of push content items.

10. A system of presenting push content items on a device to a user, the system comprising:
control circuitry configured to:
detect that a device is providing an output from an application running on the device, wherein the output comprises first displayed content;
monitor a level of engagement of the user with the application;
receive a scroll command to navigate to second displayed content from the first displayed content, wherein at least a portion of the second displayed content is not included in the first displayed content;
in response to receiving the scroll command, navigate to the second displayed content and determine that the level of engagement is above a predetermined activity level;
determine an elapsed time since the scroll command was received;

determine that the elapsed time since the scroll command was received exceeds a predetermined period of time;
determine that no additional scroll commands have been received during the elapsed time;
in response to determining, while the application on the device is opened, that the elapsed time since the scroll command was received exceeds the predetermined period of time and that no additional scroll commands have been received during the elapsed time, determine that the level of engagement is below the predetermined activity level;
determine that push content should be inserted into the second displayed content having been navigated to in response to receiving the scroll command;
identify a context of the second displayed content of the application by:
identifying a first object and a second object depicted by the second displayed content,
determining that the first object is depicted more prominently than the second object; and
in response to determining that the first object is depicted more prominently than the second object, determining that the context of the second displayed content relates to the first object;
select a push content item based at least on the context of the second displayed content; and
in response to the determination that the level of engagement is below the predetermined activity level, causing the push content item to be inserted into the second displayed content.

11. The system of claim 10, wherein to determine that the push content should be inserted into the second displayed content, the control circuitry is configured to:
identify one or more objects included in the second displayed content;
identify a region of the second displayed content which does not include the one or more objects; and
determine a size of the region.

12. The system of claim 11, wherein the control circuitry is further configured to:
compare the size of the region with a plurality of dimensional requirements for one or more push content items;
determine that the one or more push content items fit within at least one dimensional requirement for at least one push content item; and
determine to insert the push content into the region.

13. The system of claim 10, wherein, to identify the context of the second displayed content, the control circuitry is further configured to extract one or more keywords from the second displayed content,
wherein, to select the push content item based on the context of the second displayed content, the control circuitry is configured to:
access metadata associated with a plurality of push content items;
compare the one or more keywords from the second displayed content of the application to the metadata associated with the plurality of push content items; and
select the push content item from the plurality of push content items whose metadata conforms to the one or more keywords from the second displayed content.

14. The system of claim 10, wherein, to identify the context of the second displayed content of the application, the control circuitry is further configured to:
extract one or more keywords from the second displayed content of the application;
process the one or more keywords using a knowledge graph; and
extract the context of the second displayed content from the knowledge graph,
wherein, to select the push content item based on the context of the second displayed content, the control circuitry is configured to select the push content item based on the extracted context.

15. The system of claim 10, wherein, to identify the context of the second displayed content of the application, the control circuitry is further configured to:
analyze one or more images included in the second displayed content of the application;
identify one or more objects within the one or more images; and
identify an identifier for each of the one or more objects,
wherein, to select the push content item based on the context of the second displayed content, the control circuitry is configured to:
access metadata associated with a plurality of push content items; and
compare the identifier for each of the one or more objects to the metadata associated with the plurality of push content items; and
select the push content item from the plurality of push content items whose metadata conforms to the identifier for one or more of the objects on the second displayed content.

16. The system of claim 10, wherein, to identify the context of the second displayed content of the application, the control circuitry is further configured to:
analyze one or more images on the second displayed content of the application;
identify one or more objects within the one or more images on the second displayed content;
identify an identifier for each of the one or more objects;
process the identifier for each of the one or more objects using a knowledge graph; and
extract the context of the second displayed content from the knowledge graph,
wherein, to select the push content item based on the context of the second displayed content, the control circuitry is configured to select the push content item based on the extracted context.

17. The system of claim 10, wherein the control circuitry is further configured to:
access a user profile of the user;
extract user information from the user profile; and
basing selection of the push content item based on the extracted user information.

18. The system of claim 17, wherein the control circuitry is further configured to:
access metadata associated with a plurality of push content items; and
compare the user information with the metadata associated with the plurality of push content items,
wherein the selection of the push content item based on the context of the second displayed content is further based on the comparing of the user information with the metadata associated with the plurality of push content items.

* * * * *